United States Patent
de Oliveira Filho et al.

(10) Patent No.: US 11,555,140 B2
(45) Date of Patent: Jan. 17, 2023

(54) SYNERGIZED HEMIACETALS COMPOSITION AND METHOD FOR SCAVENGING SULFIDES AND MERCAPTANS

(71) Applicant: Clariant International, Ltd., Muttenz (CH)

(72) Inventors: Antonio Pedro de Oliveira Filho, São Paulo (BR); Aline Yae Kina, São Paulo (BR); Grahame N. Taylor, Jersey Village, TX (US); Fabian Schneider, Eppelheim (DE); Julie Murison, Frankfurt (DE); Stefan Hauck, Alsbach-Haehnlein (DE); Mike Sahl, Bad Camberg (DE); Matthias Krull, Harxheim (DE); Jonathan James Wylde, The Woodlands, TX (US)

(73) Assignee: CLARIANT INTERNATIONAL LTD, Muttenz (CH)

( * ) Notice: Subject to any disclaimer, the term of this patent is extended or adjusted under 35 U.S.C. 154(b) by 0 days.

(21) Appl. No.: 15/852,777

(22) Filed: Dec. 22, 2017

(65) Prior Publication Data
US 2019/0194523 A1  Jun. 27, 2019

(51) Int. Cl.
| | |
|---|---|
| C09K 8/532 | (2006.01) |
| C10G 21/16 | (2006.01) |
| C10G 33/04 | (2006.01) |
| C02F 1/20 | (2006.01) |
| B01D 53/52 | (2006.01) |
| B01D 53/78 | (2006.01) |
| C10G 21/20 | (2006.01) |
| C10G 29/22 | (2006.01) |
| C10G 29/20 | (2006.01) |
| C02F 103/10 | (2006.01) |
| C02F 101/10 | (2006.01) |
| B01D 53/14 | (2006.01) |

(52) U.S. Cl.
CPC .............. *C09K 8/532* (2013.01); *B01D 53/52* (2013.01); *B01D 53/78* (2013.01); *C02F 1/20* (2013.01); *C10G 21/16* (2013.01); *C10G 21/20* (2013.01); *C10G 29/20* (2013.01); *C10G 29/22* (2013.01); *C10G 33/04* (2013.01); *B01D 53/1493* (2013.01); *B01D 2251/21* (2013.01); *B01D 2252/202* (2013.01); *B01D 2252/205* (2013.01); *B01D 2252/504* (2013.01); *B01D 2256/24* (2013.01); *B01D 2257/304* (2013.01); *B01D 2257/306* (2013.01); *C02F 2101/101* (2013.01); *C02F 2103/10* (2013.01); *C10G 2300/202* (2013.01); *C10G 2300/207* (2013.01)

(58) Field of Classification Search
None
See application file for complete search history.

(56) References Cited

U.S. PATENT DOCUMENTS

| | | | |
|---|---|---|---|
| 2,956,963 A | 10/1960 | Baird | |
| 3,880,754 A | 4/1975 | Brost | |
| 3,880,784 A | 4/1975 | Wagner | |
| 3,928,211 A | 12/1975 | Browning | |
| 4,219,508 A * | 8/1980 | Wagner | A61K 8/345 568/387 |
| 4,680,127 A | 7/1987 | Edmondson | |
| 4,978,512 A | 12/1990 | Dillon | |
| 5,087,761 A | 2/1992 | Kikabhai | |
| 5,347,004 A | 9/1994 | Rivers | |
| 5,486,605 A | 1/1996 | Gatlin | |
| 5,728,263 A | 3/1998 | Mattila | |
| 6,117,310 A | 9/2000 | Rivers | |
| 6,348,483 B1 | 2/2002 | Beilfuss | |

(Continued)

FOREIGN PATENT DOCUMENTS

| | | |
|---|---|---|
| AU | 2002216263 | 8/2007 |
| AU | 2016239582 | 11/2017 |

(Continued)

OTHER PUBLICATIONS

"Formaldehyde", Joseph Frederic Walker, reprint 1975, Robert E. Krieger Publishing Company Inc., pp. 264-284.

(Continued)

*Primary Examiner* — Jeffrey D Washville
(74) *Attorney, Agent, or Firm* — Tod A. Waldrop

(57) ABSTRACT

This invention provides a composition comprising
I. at least one reaction product between a nitrogen-free monohydric alcohol and an aldehyde or ketone, and
II. at least one reaction product between a nitrogen-free sugar alcohol and an aldehyde or ketone, and optionally
III. at least one reaction product from
III.a) formaldehyde, and
III.b) an amine, selected from the group consisting of primary alkyl amines having 1 to 4 carbon atoms, and primary hydroxy alkyl amines having 2 to 4 carbon atoms, and optionally
IV. at least one solid suppression agent selected from the group consisting of
IV(a). alkali or alkaline earth metal hydroxides
IV(b). mono-, di- or tri-hydroxy alkyl, aryl or alkylaryl amines,
IV(c). mono-, di- or tri-alkyl, aryl or alkylaryl primary, secondary and tertiary amines or
IV(d). multifunctional amines and
IV(e). mixtures of compounds of groups IV(a) to IV(c).
wherein alkyl is $C_1$ to $C_{15}$, aryl is $C_6$ to $C_{15}$ and alkylaryl is $C_7$ to $C_{15}$.

34 Claims, No Drawings

(56) References Cited

U.S. PATENT DOCUMENTS

| | | |
|---|---|---|
| 6,355,679 B1 | 3/2002 | Beilfuss |
| 8,329,063 B2 | 12/2012 | Beilfuss |
| 10,131,861 B2 | 11/2018 | Klug |
| 2004/0096382 A1 | 5/2004 | Smith |
| 2005/0218379 A1 | 10/2005 | Beilfuss |
| 2006/0079720 A1 | 4/2006 | Xie |
| 2010/0324182 A1 | 12/2010 | Ing Roth |
| 2012/0055848 A1 | 3/2012 | Subramaniyam |
| 2012/0128561 A1 | 5/2012 | Blair |
| 2012/0241361 A1 | 9/2012 | Ramachandran |
| 2013/0172623 A1 | 7/2013 | Kaplan |
| 2013/0240409 A1 | 9/2013 | Subramaniyam |
| 2016/0175769 A1 | 6/2016 | Kamoun |
| 2017/0055524 A1 | 3/2017 | Baur |
| 2017/0081597 A1 | 3/2017 | Fuji |
| 2017/0218293 A1 | 8/2017 | Klug |
| 2018/0105732 A1 | 4/2018 | Okocha |
| 2018/0346825 A1 | 12/2018 | Hernández |
| 2019/0194523 A1 | 6/2019 | De Oliveira Filho |
| 2019/0194551 A1 | 6/2019 | De Oliveira Filho |
| 2020/0109329 A1 | 4/2020 | De Oliveira Filho |
| 2020/0157439 A1 | 5/2020 | De Oliveira Filho |

FOREIGN PATENT DOCUMENTS

| | | |
|---|---|---|
| CN | 1125430 A | 6/1996 |
| CN | 1139683 | 1/1997 |
| CN | 1315856 | 10/2001 |
| CN | 1426384 A | 6/2003 |
| CN | 1552523 A | 12/2004 |
| CN | 1845890 A | 10/2006 |
| CN | 101903449 | 12/2010 |
| CN | 102481512 | 5/2012 |
| CN | 103209752 | 7/2013 |
| CN | 103221125 | 7/2013 |
| CN | 103459561 | 12/2013 |
| CN | 103748124 | 4/2014 |
| CN | 105749591 A | 7/2016 |
| CN | 106164228 | 11/2016 |
| CN | 111163855 A | 5/2020 |
| DE | 2721186 | 11/1978 |
| EP | 0405341 | 1/1991 |
| EP | 2267098 | 12/2010 |
| EP | 3064062 | 9/2016 |
| EP | 3080046 | 10/2016 |
| EP | 3478789 B1 | 2/2020 |
| EP | 3578622 B1 | 10/2020 |
| GB | 1092657 * | 11/1967 |
| KR | 20170046845 | 5/2017 |
| TW | 201343606 | 11/2013 |
| WO | 9802501 | 1/1998 |
| WO | 02051968 | 7/2002 |
| WO | 2002051968 | 7/2002 |
| WO | 2010138842 | 12/2010 |
| WO | 2014031537 | 2/2014 |
| WO | 2015088342 | 6/2015 |
| WO | 2016050782 | 4/2016 |
| WO | 2017079817 | 5/2017 |
| WO | 2018001631 | 1/2018 |

OTHER PUBLICATIONS

Comprehensive Review of H2S Scvanger Technologies for Oil and Gas Streams vol. 4, p. 339-359, xp055463021.
International Search Report for PCT/EP2018/081002, dated Jan. 31, 2019, 3 pages.
International Search Report for PCT/EP2018/081133, dated Jan. 31, 2019, 3 pages.
Joseph Frederic Walker, Formaldehyde, Robert E. Krieger Publishing Company Inc., (1975), p. 264-284.
H. Schiweck et al., "Sugar Alcohols", Ullmann's Encyclopedia of Industrial Chemistry, (2012), 37 pages.
International Search Report for PCT/EP2017/061830, dated Jul. 28, 2017, 3 pages.
Wang Zongde et al., English abstract, "Synthesis of Hydroxycitronellal Acetal Compounds and Their Repellent Activity to Mosquitoes", Acta Entomologica Sinica, pp. 1241-1247, 2010.
"0714 Normal pressure hydrocephalus: The predictive value of cerebrospinal fluid tap-test ED—Friedman Joseph H; Bhidayasiri Roongroj; Truong Daniel D", Journal of Neurological Scien, Elsevier Scientific Publishing Co, Amsterdam, NL, vol. 238, Jan. 1, 2005 (Jan. 1, 2005), pp. 5281-S282, XP005546902.
European Search Report for EP18150085, dated Apr. 20, 2018, 7 pages.
European Search Report for EP18150087, dated Apr. 20, 2018, 7 pages.

* cited by examiner

SYNERGIZED HEMIACETALS COMPOSITION AND METHOD FOR SCAVENGING SULFIDES AND MERCAPTANS

The invention relates to a composition and a process for scavenging hydrogen sulfide from liquids and/or gas by using a synergistic combination of acetals in admixture with a reaction product from formaldehyde and amines and/or a solids suppression agent. The formulations containing the inventive composition have particular applicability in scavenging hydrogen sulfide and/or mercaptans yet at the same time prevent the formation of unwanted emulsions and/or deposition of unwanted by-products often associated with using chemistries and/or formulations of the prior art.

The presence of compounds containing a sulfhydryl group (—SH) and particularly of hydrogen sulfide pose challenges in many industries. Their presence can create a significant health, safety and environmental challenge. There are many different types of compounds containing a sulfhydryl group ("sulfhydryl compounds"), with the most commonly encountered molecules including hydrogen sulfide ($H_2S$), organo-sulfur compounds containing R—SH groups (also called mercaptans), thiocarboxylic acids RC(O)SH, dithiocarboxylic acids RC(S)SH, and related compounds.

In the oil and gas industry the $H_2S$ content of crude oil and natural gas in many areas of the world is high enough to present environmental and safety hazards. Hydrogen sulfide is a flammable, corrosive, and highly toxic gas. $H_2S$ is the most reduced form of sulfur and is produced by sulfate reducing bacteria (SRB) that are often found in anaerobic oilfield environments, or caused by thermal cracking and thermochemical sulfate reduction (TSR) by hydrocarbons. As crude oil is produced, it is depressurized and dissolved $H_2S$ is released and can then be transferred to, for example, oil based drilling fluid during the drilling process and this can become a hazard as the drilling fluid is recirculated from the well to the surface. During the production phase of crude oil and natural gas $H_2S$ gas can create a significant asset integrity risk as it is an acid gas and upon dissolving into produced water creates a very corrosive environment. In addition, the presence of $H_2S$ increases the risks of sulfide stress cracking, hydrogen embrittlement and pitting corrosion of some structural materials and requires to be removed in order for fluids and gases to be safely processed.

The odor of sulfhydryl compounds is also a challenge in, for example, metal working environments, but equally in water treatment processes, either municipal (e.g. waste water treatment) or industrial (e.g. recycling of mining water). SRB are often present in the recirculating fluid systems, and though the bacteria can usually be controlled by the use of biocidal compositions, often control of the biology in the system gets lost which results in the development of hazardous $H_2S$ and/or mercaptans in the system. Furthermore biocides are inefficient at removing $H_2S$ after it forms and only anecdotally scavenge $H_2S$, via either oxidation (e.g. sodium hypochlorite application) or due to the release of low levels of aldehyde during their breakdown (e.g. with glutaraldehyde). Sulfhydryl compounds and particularly $H_2S$ can present environmental, toxicity and integrity challenges in gaseous phases in confined spaces, as for instance in sewage treatment facilities and particularly in shipping and storage containers for moisture sensitive materials that may emit $H_2S$ which can accumulate in the gaseous headspace. It would be desirable to have a scavenger that can reduce the $H_2S$ concentration in such locations.

Most commonly used sulfhydryl scavengers are based on metals as for example copper, zinc or iron which are converted to insoluble sulfides. A number of alternative, metal free methods have been proposed to scavenge hydrogen sulfide and to control sulfhydryl odors in hydrocarbon containing systems, including:

WO-98/02501 describes the use of bisoxazolidines prepared by the reaction of 1,2- or 1,3-amino alcohols containing 3 to 7 carbon atoms with aldehydes containing 4 or fewer carbon atoms, as for example 3,3'-methylenebis-5-methyl-oxazolidine. The relative oil and water solubility of these products can be controlled through the choice of starting materials. These bisoxazolidines react with sulfhydryl compounds present in oil and gas streams to neutralize and therefore scavenge them.

U.S. Pat. No. 5,347,004 teaches the use of reaction products of alkoxyalkylene amine, optionally in admixture with ammonia and/or alkylamines with aldehydes to remove $H_2S$ from gas streams which are sparged into water solutions of the reaction products.

WO-2014/031537 teaches the use of an aldehyde releasing compound, preferably a hydantoin compound, to remove sulfhydryl compounds from hydrocarbon fluids.

U.S. Pat. No. 3,928,211 describes the use of inorganic zinc salts (most preferably zinc carbonate) preferably dispersed in aqueous or non-aqueous oil well drilling fluids with an organic dispersant such as lignin containing materials for scavenging hydrogen sulfide in aqueous drilling fluids.

WO-2002/051968 teaches a process for reducing the level of hydrogen sulfide in a liquid or gas by treatment of the liquid or gas with an $H_2S$-scavenger product derivable from the reaction of a carbonyl group-containing compound with an alcohol, thiol, amide, thioamide, urea or thiourea. The carbonyl group-containing compound is preferably formaldehyde, and preferably the product is derivable by reaction of formaldehyde with an amine-free alcohol or urea selected from ethylene glycol, propylene glycol, glycerol, diethylene glycol, triethylene glycol, ethyl alcohol, n-butanol, a sugar, a low molecular weight polyvinyl alcohol, castor oil fatty acid and urea. More especially, the scavenger product is used with an amine, especially monoethanolamine or monoethanolamine triazine.

U.S. Pat. No. 4,978,512 teaches a method of reducing $H_2S$ levels, the method comprising bringing the $H_2S$ containing medium into contact with inter alia acetals and bisoxazolidines.

The object of this invention is to provide compositions which can be used for scavenging of sulfhydryl compounds in crude oil, gas production, water production, water injection and combinations thereof, preferably, but not limited to $H_2S$ and/or mercaptans. The compositions of the invention should be notable for improved safety and performance compared to the formulations and chemistries of the prior art, i.e. they should contain low amounts of toxic substances like free formaldehyde even after prolonged storage. They should have a higher scavenging efficiency than scavengers according to the state of the art and especially for the treatment of gases as for example of natural gas they should assure an efficient scavenging of sulfhydryl compounds within a short contact time. Furthermore it is desirable to have a scavenger that does not produce unwanted solid by-products and/or form emulsions that can inadvertently contaminate the very systems they are treating. In particular the formation of solid products which may plug lines and vessels shall be retarded or even inhibited in order to facilitate the removal of the sulfhydryl reaction products formed during the scavenging process.

Surprisingly it has been found that a composition comprising at least one reaction product between a monohydric alcohol and an aldehyde or ketone and at least one reaction product of a sugar alcohol and an aldehyde or ketone shows improved capability in scavenging sulfhydryl compounds in comparison to the respective reaction products of the individual alcohols. Such composition allows i) for a lower dosage rate of scavenger to obtain the same level of residual amount of sulfhydryl compound and/or ii) for a lower level of residual amount of sulfhydryl compound with the same dosage rate of scavenger. Furthermore, in combination with at least one reaction product from formaldehyde and an amine (hereinafter also referred to as "synergist") the kinetics of scavenging $H_2S$ and/or mercaptans provided by the reaction products of a monohydric alcohol and a sugar alcohol with an aldehyde and/or ketone can be significantly accelerated. Alternatively to the synergist or in addition to the synergist, the admixture of a solids suppression agent as a further synergistic additive facilitates the removal of sulfhydryl reaction products especially in continuously operated scavenging processes. Furthermore the admixture of the synergist and/or the further synergist extends the gas breakthrough time of sulfhydryl compounds in a contact tower containing the reaction products of a monohydric alcohol with an aldehyde and/or ketone and a sugar alcohol with an aldehyde and/or ketone.

The use of the synergist and/or the further synergist of the invention enables the mixed hemiacetals and acetals to react much more efficiently with sulfhydryl compounds and especially with $H_2S$. The mechanism believed to be involved in this reaction, but which should not be considered to be limiting to the invention in any way, occurs due to the likelihood that the synergist component reacts preferentially with $H_2S$ forming an intermediate reaction complex which then in turn reacts with a molecule of hemiacetal respectively acetal reforming a molecule of synergist and liberation of the corresponding alcohol present in the (hemi-)acetal. After the $H_2S$ scavenging process the residual synergist then works as a corrosion inhibitor, protecting the integrity of the pipelines and equipment in which it has been applied.

Within the scope of this application the expressions "hemiacetal" and "acetal" encompass the reaction products of an alcohol with either an aldehyde or a ketone, i. e. they include hemiketals respectively ketals when using a ketone instead of an aldehyde in the reaction with an monohydric and/or sugar alcohol. The expression "(hemi-)acetals" encompasses hemiacetals, acetals and their mixtures which are often formed during reaction of alcohols and carbonyl compounds.

In a first aspect of the invention, there is provided a composition comprising
I. at least one reaction product between a nitrogen-free monohydric alcohol and an aldehyde or ketone, and
II. at least one reaction product between a sugar alcohol and an aldehyde or ketone.

In a second aspect of the invention there is provided a composition comprising
I. at least one reaction product between a nitrogen-free monohydric alcohol and an aldehyde or ketone, and
II. at least one reaction product between a sugar alcohol and an aldehyde or ketone, and
III. at least one reaction product from formaldehyde and ammonia and/or an amine selected from the group consisting of primary alkyl amines having 1 to 10 carbon atoms and primary hydroxy alkyl amines having 2 to 10 carbon atoms.

In a third aspect of the invention there is provided a composition comprising
I. at least one reaction product between a nitrogen-free monohydric alcohol and an aldehyde or ketone, and
II. at least one reaction product between a sugar alcohol and an aldehyde or ketone, and
IV. at least one inorganic or organic alkaline compound that functions as a solids suppression agent.

In a fourth aspect of the invention there is provided a composition comprising
I. at least one reaction product between a nitrogen-free monohydric alcohol and an aldehyde or ketone, and
II. at least one reaction product between a sugar alcohol and an aldehyde or ketone, and
III. at least one reaction product from formaldehyde and ammonia and/or an amine selected from the group consisting of primary alkyl amines having 1 to 10 carbon atoms and primary hydroxy alkyl amines having 2 to 10 carbon atoms, and
IV. at least one inorganic or organic alkaline compound that functions as a solids suppression agent.

In a fifth aspect of the invention, there is provided the use of the composition of the first, second, third or fourth aspect of the invention as a scavenger for sulfhydryl compounds for application in oilfield operations and process systems.

In a sixth aspect of the invention, there is provided a process for scavenging sulfhydryl compounds in oilfield operations and process systems, the process comprising adding to a system susceptible to liberation of sulfhydryl compounds the composition of the first, second, third or fourth aspect of the invention.

In a seventh aspect of the invention there is provided the use of at least one reaction product from
III. formaldehyde and ammonia and/or an amine, selected from the group consisting of primary alkyl amines having 1 to 10 carbon atoms and primary hydroxy alkyl amines having 2 to 10 carbon atoms,
as a synergist in the reaction between
a) I. the reaction product between a nitrogen-free monohydric alcohol and an aldehyde or ketone, and
a) II. the reaction product between a sugar alcohol and an aldehyde or ketone, and
b) a sulfhydryl compound.

In an eighth aspect of the invention there is provided the use of at least
IV. one inorganic or organic alkaline compound
as a solids suppression agent in the reaction between
a) I. the reaction product between a nitrogen-free monohydric alcohol and an aldehyde or ketone, and
a) II. the reaction product between a sugar alcohol and an aldehyde or ketone, and
b) a sulfhydryl compound.

In preferred embodiments of the invention, at least one demulsifier (V) and/or corrosion inhibitor (VI) is present in any aspect of the invention.

Group I

The group I compound is the reaction product of a monohydric alcohol and an aldehyde or ketone. The monohydric alcohol does not contain nitrogen.

Preferred monohydric alcohols as starting materials are alkyl, aryl and arylalkyl alcohols containing one hydroxy group and 1 to 15 carbon atoms, more preferably 1 to 10 carbon atoms and especially 2 to 5 carbon atoms as for example 1 to 5, or 2 to 15, or 2 to 10 carbon atoms. The hydroxyl group of preferred monohydric alcohols is bound to an aliphatic, alicyclic and/or aromatic moiety, preferably to an aliphatic, alicyclic and/or aromatic hydrocarbon moiety, and more especially to an aliphatic or cycloaliphatic hydrocarbon moiety. The aliphatic and cycloaliphatic moieties may be saturated or unsaturated, preferably they are saturated. Aliphatic moieties with 3 or more carbon atoms may be linear or branched. More especially the monohydric alcohol is aliphatic. In particular the alcohol is an alkyl alcohol. Examples for preferred alcohols are methanol, ethanol, propanol, iso-propanol, n-butanol, iso-butanol, tert-butanol and the various isomers of pentanol, hexanol, heptanol and octanol as for example 2-ethyl hexanol and their mixtures. Especially preferred are methanol and ethanol.

Preferred aldehydes or ketones as starting materials contain one or more carbonyl groups, more preferably one or two carbonyl groups and especially one carbonyl group. Furthermore, preferred aldehydes and ketones contain 1 to 10 carbon atoms, more preferably 1 to 7, and especially 1 to 4 carbon atoms. In preferred aldehydes the carbonyl group carries one and in preferred ketones two aliphatic, alicyclic and/or aromatic substituents. More preferably the substituents are aliphatic, alicyclic and/or aromatic hydrocarbon substituents and especially the substituents are aliphatic hydrocarbon groups. Preferred aliphatic and cycloaliphatic substituents may be saturated or unsaturated, most preferably they are saturated. In a particularly preferred embodiment the saturated aliphatic groups are alkyl groups. In ketones both substituents may be the same or different.

In a preferred embodiment the carbonyl compound is an aldehyde, more preferably a mono- or di-aldehyde, and especially formaldehyde. It should be understood that the terms "aldehyde" and "formaldehyde" include precursors like e.g. para-formaldehyde, formalin, and other chemical forms from which the basic structure HCHO can be released or set free during the reaction with an alcohol. Other suitable aldehydes include, for example, acetaldehyde, propionaldehyde, butyraldehyde, glutaraldehyde and glyoxal. Suitable ketones include, for example, acetone, methyl ethyl ketone, diethylketone, methyl isopropyl ketone, hexanones and heptanones.

Mixtures of two or more carbonyl compounds, for example two or more of the aldehydes mentioned above, e.g. formaldehyde and one or more other aldehydes, may be used if desired.

In the reaction between monohydric alcohol and aldehyde and/or ketone part or all of the alcohols may be converted to hemiacetals and/or acetals. In a preferred embodiment, the reaction product is a hemiacetal. In a preferred embodiment at least 50 mol-% of the alcohol, more preferably 60 to 99 mol-% of the alcohol, especially 65 to 95 mol-% of the alcohol and especially preferred 70 to 90 mol-% of the alcohol as for example more than 60 mol-%, more than 65 mol-%, more than 70 mol-%, % of the alcohol or 50 to 99 mol-%, 50 to 95 mol-%, 50 to 90 mol-%, 60 to 95%, 60 to 90 mol-%, 65 to 99 mol-%, 65 to 90 mol-%, 70 to 99 mol-% or 70 to 95 mol-% of the alcohol are converted to hemiacetals and/or acetals. In case the degree of conversion is low, some unreacted monohydric alcohol remains in the composition. The presence of residual alcohol in the reaction mixture has proven to be advantageous as upon its reaction with sulfhydryl compounds often the formation of solid precipitate gets reduced. Furthermore, remaining alcohol will act as a solvent.

Group II

The group II compound is the reaction product of a sugar alcohol and an aldehyde or ketone. Sugar alcohols are also known as "alditols".

Preferred sugar alcohols as starting materials for the group II compounds are polyols obtainable by reduction of the carbonyl group of saccharides whereby an aldehyde or ketone function is replaced by a hydroxyl group. Accordingly sugar alcohols differ from carbohydrates in that they lack a carbonyl group. Preferred sugar alcohols are non-reducing. Preferably the sugar alcohol does not contain nitrogen. A review on sugar alcohols has been published in 2012 by H. Schiweck et al. in Ullmann's Encyclopedia of Industrial Chemistry.

Preferred sugar alcohols have 4 to 12 carbon atoms and 4 to 10 hydroxyl groups, more preferably 4 to 6 carbon atoms and 4 to 6 hydroxyl groups and especially 5 or 6 carbon atoms and 5 or 6 hydroxyl groups wherein not more than one hydroxyl group is bound to each carbon atom.

In preferred sugar alcohols with 4 to 6 carbon atoms each carbon atom carries one hydroxyl group. The carbon chain is preferably saturated and may be linear ("glykitols") or cyclic ("cyclitols"). According to their stereochemistry different isomers exist. All isomers are similarly suited as starting material for the group II compound.

Preferred linear sugar alcohols have the general formula (1)

$$HO-CH_2-(CHOH)_n-CH_2-OH \qquad (1)$$

wherein n is an integer between 2 and 4 as for example 2, 3 or 4.

Preferred sugar alcohols with 4 carbon atoms and 4 hydroxy groups ("tetritols") are erythritol and threitol. Preferred sugar alcohols with 5 carbon atoms and 5 hydroxy groups ("pentitols") are arabitol, ribitol and xylitol. Preferred sugar alcohols with 6 carbon atoms and 6 hydroxy groups ("hexitols") are allitol, galactitol (=dulcitol), glucitol (=sorbitol), iditol, mannitol and talitol (=altritol).

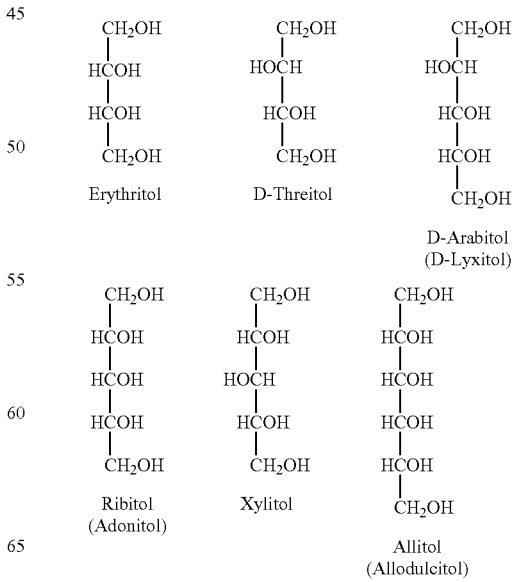

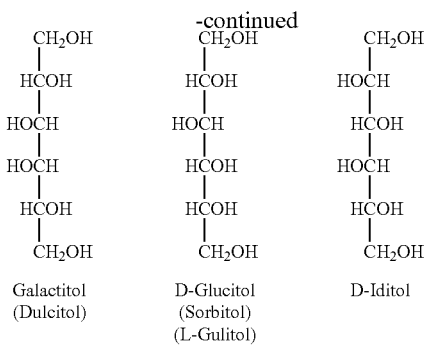

Galactitol (Dulcitol)  D-Glucitol (Sorbitol) (L-Gulitol)  D-Iditol

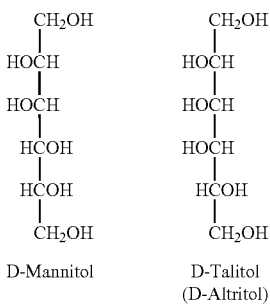

D-Mannitol  D-Talitol (D-Altritol)

Preferred cyclic sugar alcohols have the molecular formula $C_6H_6(OH)_6$. Most preferred cyclic sugar alcohols are the various stereoisomers of 1,2,3,4,5,6-cylcohexanehexol (inositol). Especially preferred cyclic sugar alcohol is cis-1,2,3,5-trans-4,6-cyclohexanehexol ("myo-inositol").

The majority of sugar alcohols occur naturally in the vegetable kingdom. Accordingly they can be extracted from plant raw material or marine algae. Most of the sugar alcohols can also be produced synthetically, for example by catalytic hydrogenation of sugars and/or by fermentative or enzymatic processes starting from simple sugars and especially from monoglycerides like xylose, glucose, sucrose and mannose. Linear hexitols with the general formula $HO—CH_2—(CHOH)_4—CH_2—OH$ can be produced from the structurally related hexoses by catalytic reduction. For example, sorbitol and mannitol are obtained in technical quantities by hydrogenation of glucose and mannose using Raney nickel catalysts. Erythritol on the other hand is obtained predominantly by fermentation of glucose or sucrose.

In a further preferred embodiment more complex disaccharide sugar alcohols obtained by reduction of disaccharides are used as starting materials for the group II compound. Preferred disaccharide sugar alcohols contain a saccharide moiety bound to a linear sugar alcohol moiety via an acetal or ketal link. Examples for sugar alcohols containing a saccharide moiety are the isomalt diastereomers (6-O-α-D-glucopyranosyl-D-sorbitol and 1-O-α-D-glucopyranosyl-D-mannitol), the maltitol isomers (4-O-α-D-glucopyranosyl-D-sorbitol and 4-O-α-D-glucopyranosyl-D-glucitol) and lactitol (4-O-(β-D-galactopyranosyl)-D-glucitol).

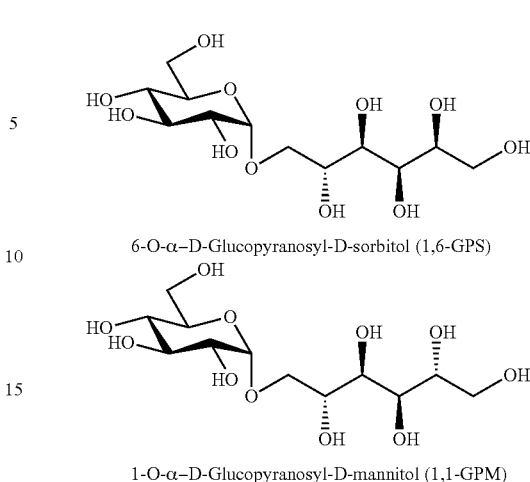

6-O-α–D-Glucopyranosyl-D-sorbitol (1,6-GPS)

1-O-α–D-Glucopyranosyl-D-mannitol (1,1-GPM)

In a further preferred embodiment partial esters and ethers of sugar alcohols are used as starting materials for the group II compound. Preferred partial esters and ethers contain at least two, preferably at least three and more preferably at least four as for example 5 non-derivatised hydroxyl groups which are accessible for reaction with an aldehyde or ketone. Especially preferred are esters with $C_1$- to $C_{24}$-carboxylic acids and ethers with $C_1$- to $C_{24}$-alcohols and ethers formed by intramolecular dehydration reaction. Examples for suited derivatives of sugar alcohols are pinitol ((1S,2S,4S,5R)-6-methoxycyclohexane-1,2,3,4,5-pentol), 1,4-sorbitan, 3,6-sorbitan and isosorbide.

The most preferred sugar alcohols used as starting materials for the group II compound are sorbitol, xylitol, erythritol, mannitol, lactitol, isomalt and maltitol.

For the reaction between sugar alcohol and aldehyde and/or ketone the sugar alcohol may be applied as a solid or as a concentrated solution often called syrup.

Preferred aldehydes and ketones as starting materials for the group II compounds are the aldehydes and ketones that have already been described above with respect to group I. Most preferred aldehyde as starting material for group II compounds is formaldehyde. The aldehyde or ketone used for reaction with the sugar alcohol may be the same as the one used for the monohydric alcohol, or it may be a different one.

In the reaction between sugar alcohol and aldehyde and/or ketone part or all of the hydroxyl groups may be converted to hemiacetals and/or acetals. In a preferred embodiment at least 50 mol-% of the hydroxyl groups, more preferably 60 to 99 mol-% of the hydroxyl groups, especially 65 to 95 mol-% of the hydroxyl groups and especially preferred 70 to 90 mol-% of the hydroxyl groups as for example more than 60 mol-%, more than 65 mol-%, more than 70 mol-%, or 50 to 99 mol-%, 50 to 95 mol-%, 50 to 90 mol-%, 60 to 95%, 60 to 90 mol-%, 65 to 99 mol-%, 65 to 90 mol-%, 70 to 99 mol-% or 70 to 95 mol-% of the hydroxyl groups are converted to hemiacetals and/or acetals. In case the degree of conversion is low some unreacted sugar alcohol remains in the composition. The presence of residual hydroxyl groups in the reaction mixture has proven to be advantageous as upon its reaction with sulfhydryl compounds the formation of solid precipitate gets reduced.

In a particularly preferred embodiment the reaction product between the sugar alcohol respectively the monohydric alcohol and the aldehyde is predominantly a mixture of hemiacetals and acetals. Preferred are reaction products wherein the ratio between hemiacetals and acetals on a molar basis is between 100:1 and 1:10 more preferably between 50:1 and 1:5 and especially between 20:1 and 1:1 as for example between 100:1 and 1:5 or between 100:1 and 1:1 or between 50:1 and 1:10 or between 50:1 and 1:1 or between 20:1 and 1:10 or between 20:1 and 1:5.

Preferred polyhydric hemiacetal compounds derived from sugar alcohols that can be used as the scavenger are exemplified by the structures (2) to (5) derived from glucitol below:

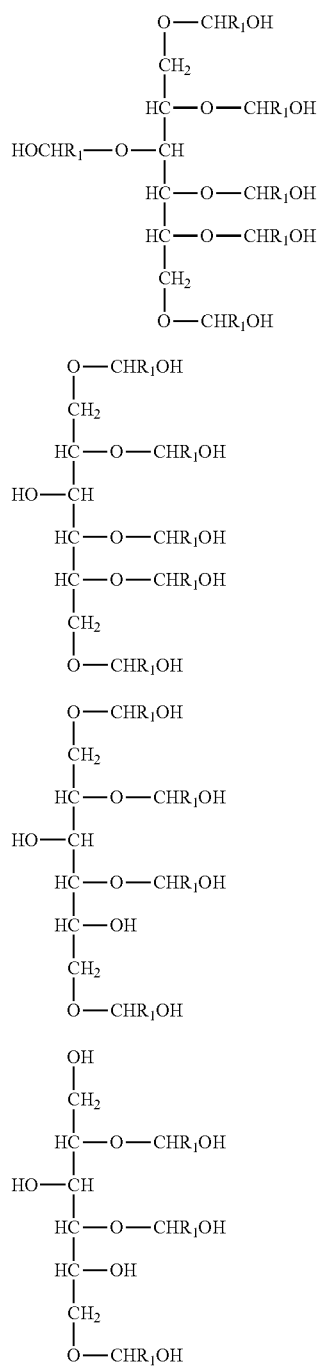

wherein
$R_1$ is H or $C_1$ to $C_9$ alkyl.

The corresponding enantiomers and diastereomers based on other sugar alcohols are similarly suited.

Reactions of aldehydes and ketones with alcohols are described in the literature. "Formaldehyde", p 265, Joseph Frederic Walker, reprint 1975, Robert E. Krieger Publishing Company Inc. discloses that hemiacetals are obtained when formaldehyde and alcohols are brought together under neutral or alkaline conditions, and that they form readily in the case of primary and secondary alcohols.

The synthesis of compounds of group I and group II may be accomplished in separate reactions. Preferably it is accomplished in a simultaneous reaction using a one pot reaction by charging a mixture of monohydric alcohol and sugar alcohol and reacting this mixture with the aldehyde and/or ketone. A one-pot reaction is especially preferred when the aldehyde used for the reaction with the monohydric alcohol is the same as the aldehyde used for the reaction with the sugar alcohol.

For ease of reaction the presence of an aqueous solvent has proven to be advantageous. Preferably the reaction is made in the presence of 5 to 70 wt.-%, more preferably in the presence of 10 to 50 wt.-% and especially in the presence of 15 to 40 wt.-% of water in respect to the overall reaction mass. Often the amount of water introduced by the reactants like for example by formalin is sufficient. In a preferred embodiment the water remains in the reaction product.

In the synthesis of compounds of group I and group II the molar ratio of hydroxyl groups to carbonyl groups is preferably between 20:1 and 1:5 and more preferably between 10:1 and 1:2 and especially between 2:1 and 1:1 as for example between 20:1 and 1:2 or between 20:1 and 1:1 or between 10:1 and 1:5 or between 10:1 and 1:1 or between 2:1 and 1:5 or between 2:1 and 1:2. In a preferred embodiment the reactants are reacted in a substantially stoichiometric ratio.

However, in order to reduce the presence of residual (unreacted) free carbonyl compound in the final product to extremely low levels it has proven to be advantageous not to proceed to full reaction of all hydroxyl groups, i.e. to react only part of the hydroxy groups of the alcohols of groups I and/or II with the aldehyde. Accordingly, in a preferred embodiment the reaction between the alcohols and the aldehyde is made with less than the stoichiometric amount of carbonyl compound in respect to the hydroxyl groups of the alcohols. A preferred molar ratio of carbonyl groups to hydroxyl groups is between 1.01:1.50 and especially between 1.05 and 1.20 as for example between 1.01 and 1.20 or between 1.05 and 1.50. The ratios given above similarly apply for the reaction of the carbonyl compound with the monohydric alcohols of group I respectively with the sugar alcohols of group II in separate reaction steps as well as for the reaction with their mixture in a one-pot reaction.

Group III

The group III component is optional. The group III compound is the reaction product from formaldehyde with ammonia and/or an amine, the amine being selected from the group consisting of primary alkyl amines having 1 to 10 carbon atoms and primary hydroxy alkyl amines having 2 to 10 carbon atoms. This group comprises the synergist component of the inventive composition according to the second and fourth aspect of the invention.

Preferred primary amines comprise 1 to 4 carbon atoms, preferred primary hydroxy amines 2 to 4 carbon atoms. Especially preferred primary hydroxy amines correspond to the formula (6)

$$HO\text{-}A\text{-}NH_2 \qquad (6)$$

wherein A is a linear or branched alkylene group with 2 to 4 carbon atoms.

Examples of nitrogen containing compounds suitable for the present invention include, but are not limited to: ammonia, methylamine, ethylamine, propylamine, isopropyl amine, monoethanolamine, 1-amino-2-propanol, 3-amino-1-propanol, 2-amino-1-butanol, 3-amino-1-butanol, 3-amino-1-butanol, 2-ethoxypropylamine, 3-ethoxypropylamine, 1-methoxyisopropylamine and 2-methoxyethylamine.

The nitrogen containing compound and formaldehyde may be reacted in any molar ratio with a preferred ratio being from 1 mole aldehyde to 10 moles nitrogen containing compound to 10 moles aldehyde to 1 mole nitrogen containing compound, a more preferred ratio being from 1 mole aldehyde to 5 moles nitrogen containing compound to 5 moles aldehyde to 1 mole nitrogen containing compound, an even more preferred ratio being 1 mole aldehyde to 3 moles nitrogen containing compound to 3 moles aldehyde to 1 mole nitrogen containing compound and a most preferred ratio being 1 mole aldehyde to 1 mole nitrogen containing compound.

The structure of the aminal formed from the reaction of formaldehyde and the nitrogen containing compound is dependent upon the selected nitrogen containing compound and the selected molar ratio between formaldehyde and nitrogen compound, as is self-evident to those of ordinary skill in the art. Similarly, mixtures of the above nitrogen containing compounds may also be reacted in order to form singular, or mixtures of various aminals as is also evident to one of ordinary skill in the art.

In one preferred embodiment the reaction product corresponds to formula (6a)

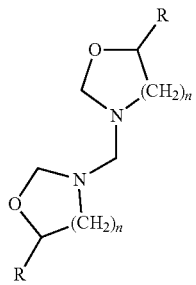

(6a)

wherein

R is H or methyl, and n is 1 or 2.

In an especially preferred embodiment R is $CH_3$. In another especially preferred embodiment, n is 1. In a particularly preferred embodiment n is 1 and R is $CH_3$. The name of this compound is 3,3'-methylenebis-5-methyl-oxazolidine (MBO).

In another preferred embodiment the reaction product corresponds to formula (6b)

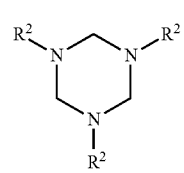

(6b)

wherein each $R^2$ is $C_1$ to $C_4$ alkyl or $C_2$ to $C_4$ hydroxy alkyl. Examples for especially preferred compounds are hexahydro-1,3,5-trimethyl-s-triazine, hexahydro-1,3,5-triethyl-s-triazine, hexahydro-1,3,5-tris(hydroxymethyl)-s-triazine and hexahydro-1,3,5-tris(2-hydroxyethyl)-s-triazine.

Mixtures of different reaction products of structures 6a and 6b are equally suited. The substituents R and $R^2$ may be the same or different.

Group IV

The group IV component is optional. The group IV compound is an inorganic or organic alkaline compound. This group comprises the solids suppression agent of the inventive composition according to the third and fourth aspect of the invention.

The solid usually formed by the reaction of group I and group II compounds with hydrogen sulfide is 1,3,5-trithiane. Addition of an alkaline compound to the compounds of groups I and II prevents or at least retards the formation of the poorly soluble 1,3,5-trithiane upon their reaction with sulfhydryl compounds. Without being bound to this theory it is believed that different intermediates as for example polyoxymethylenesulfide oligomers are formed and stabilized by the presence of the alkaline compound of group IV. By preventing the formation of solids the scavenging composition remains homogeneous and especially in a contact tower application allows for more efficient and up to quantitative use of the (hemi-)acetals of group I and II compounds and thereby reduces the amount of chemicals required. This may result in an extended gas breakthrough time in such scavenging applications. Additionally, in direct injection applications for continuous scavenging of sulfhydryl compounds from e.g. natural gas streams the removal of the liquid reaction products is much easier than removal of solids and it is not prone to blockage of tubings and vessels.

Furthermore, in the presence of an alkaline compound of group IV the stability of compounds I and II is increased and e.g. gassing of formaldehyde is further reduced or even prevented. This leads to a further reduced level of free formaldehyde in the space above the composition and thereby further improves the safety of the personnel handling the inventive composition.

Preferably, the compound of group IV is soluble in, or miscible with the mixture of compounds of groups I and II. In a further preferred embodiment the compound of group IV is soluble in, or miscible with the formulation of the mixture of compounds of groups I and II in the presence of an aqueous solvent.

In a preferred embodiment, the alkaline compound is selected from the group consisting of IV(a). alkaline metal salts or alkaline earth metal salts, IV(b). ammonia; alkyl amines, aryl amines or alkylaryl amines, IV(c). hydroxy alkyl amines, hydroxy aryl amines or hydroxy alkylaryl amines, IV(d). multifunctional amines, and IV(e). mixtures of compounds of groups IV(a) to IV(c).

In an aryl amine, the N atom is bonded to the aromatic system. In an alkyl aryl amine, the N atom may be bonded to either the aromatic system or the alkyl group.

Preferred cations of the alkaline metal and alkaline earth metal salts IV(a) are derived from lithium, sodium, potassium, rubidium, beryllium, magnesium, calcium and strontium with sodium, potassium and calcium being especially preferred. Preferred anions are hydroxyl and carbonate groups with hydroxyl being especially preferred. Examples for preferred alkali or alkaline earth metal salts LiOH, NaOH, KOH, $Mg(OH)_2$, $Ca(OH)_2$, $Be(OH)_2$, $Na_2CO_3$, $K_2CO_3$, $NaHCO_3$, $KHCO_3$, $BeCO_3$, $MgCO_3$, $CaCO_3$, $Mg(HCO_3)_2$, $Ca(HCO_3)_2$ and their mixtures. Especially preferred alkali and alkaline earth metal salts of group IVa are NaOH, KOH, $Mg(OH)_2$ and $Ca(OH)_2$.

The amines of group IV(b) may be primary, secondary or tertiary amines. Preferred amines have up to 20 carbon atoms, more preferably between 1 and 10 and especially between 2 and 4 carbon atoms as for example between 1 and 20, between 1 and 4, between 2 and 20 or between 2 and 10 carbon atoms. Preferred hydrocarbyl residues are alkyl, aryl and alkylaryl residues, with alkyl residues being particularly preferred. In secondary and tertiary amines the hydrocarbyl residues may be the same or different. Especially preferred amines are alkyl amines with 1 to 4 carbon atoms per alkyl residue. Examples for especially preferred amines are methylamine, dimethylamine, trimethylamine, ethylamine, diethylamine, triethylamine, propylamine, isopropylamine and butylamine.

The hydroxy amine of group IV(c) may be a primary, secondary or tertiary amine. It may contain one, two or three hydroxy groups. In a preferred embodiment each hydrocarbyl substituent of the nitrogen is substituted by not more than one hydroxy group. Preferred amines have up to 20 carbon atoms, more preferably between 1 and 10 and especially between 2 and 4 carbon atoms as for example between 1 and 20, between 1 and 4, between 2 and 20 or between 2 and 10 carbon atoms. In secondary and tertiary amines the hydrocarbyl respectively hydroxyalkyl residues may be the same or different. Preferred hydrocarbyl residues are alkyl, aryl and alkylaryl residues, with alkyl residues being particularly preferred. Especially preferred hydroxy amines are hydroxyalkyl amines with 1 to 4 carbon atoms per alkyl residue. Examples for especially preferred hydroxy amines of group IV(c) are monoethanolamine, diethanolamine, 1-amino-2-propanol, 3-amino-1-propanol, 2-amino-1-butanol, 3-amino-1-butanol, 3-amino-1-butanol, 2-ethoxypropylamine, 3-ethoxypropylamine, 1-methoxyisopropylamine, 2-methoxyethylamine, 2-(2-aminoethoxy)ethanol, dimethylethanolamine, N-methyldiethanolamine and monomethylethanolamine.

Preferred multifunctional amines of group IV(d) contain, besides an amino group, at least one further functional group selected from the group consisting of amino groups, ether groups and acid groups or an ester, amide or salt thereof. Preferred multifunctional amines have up to 50 carbon atoms, more preferably between 1 and 20 and especially between 2 and 10 carbon atoms as for example between 1 and 50, between 1 and 10, between 2 and 50 or between 2 and 20 carbon atoms. The hydrocarbon chains may be linear, branched and/or cyclic. In a preferred embodiment they contain 1 to 10 and especially 2 to 5 as for example 1 to 5 further amino groups and/or ether groups. Preferably the amino- and/or ether groups are separated by at least two carbon atoms. Examples for especially preferred multifunctional amines of group IV(d) are ethylenediamine, diethylenetriamine, triethylenetetramine, tetraethylenepentamine, poly(ethylene imine), propylene diamine, dipropylenetriamine, N,N-dimethyldipropylenetriamine, aminoethylenepiperazine, aminoethylethanolamine, tallow fatty propylene diamine ethoxylated with 2 to 20 moles ethylene oxide, oleyl amine ethoxylated with 2 to 20 mole ethylene oxide, morpholine and piperazine.

In a further preferred embodiment the multifunctional amines of group IV(d) contain, besides an amino group, an acid group or an ester, amide or salt thereof. Preferred acid groups are sulfonic acids, phosphoric acids and carboxylic acids. Especially preferred multifunctional amines carrying a carboxylic acid group are amino acids. Preferred amino acids include proteinogenic and non-proteinogenic amino acids. The amino group and the carboxylic acid group may be located at the same or at different carbon atoms. Carboxylic acid groups and other acidic groups are especially preferred in their neutralized form, e.g. as alkaline or earth alkaline salts. Especially preferred amino acids contain further functional groups including, hydroxyl, carboxyl, amide, ether, guanidino, hydroxyphenyl, imidazolyl and/or further amine groups. Examples of preferred multifunctional amines carrying and acid group are glycine, alanine, leucine, isoleucine, proline, serine, threonine, asparagine, glutamine, phenylalanine, tryptophan, tyrosine, valine, aspartic acid, glutamic acid, methionine, sarcosine and taurine and their carboxylate salts with sodium and/or potassium. Especially preferred amino acids are glycine, lysine, histidine and arginine.

When mixtures IV(d) of alkaline compounds of the groups IV(a) to IV(c) are used, they may comprise 2 or more, preferably 2 to 10 and especially 3 to 5 as for example two, three, four or five different components selected form the groups IV(a) to IV(c). The portion of each individual compound in the mixture of the compounds of groups IV(a) to IV(c) is preferably between 5 and 95 wt.-%, more preferably between 10 and 90 wt.-% and especially between 20 and 80 wt.-% as for example between 5 and 90 wt.-%, between 5 and 80 wt.-%, between 10 and 95 wt.-%, between 10 and 80 wt.-%, between 20 and 95 wt.-% or between 20 and 90 wt.-%.

Group V

The group V component is optional. This group comprises emulsion breakers, demulsifiers and/or non-emulsifiers. The purpose of having the compounds of group V present is to prevent the formation of emulsions during the scavenging process and to improve the efficiency of the scavenging process. Often metal sulfides as for example iron sulfide are formed e.g. by corrosion of pipelines and equipment in the presence of sulfhydryl compounds. Being in the form of fine solids they accumulate at the oil water interface, thereby stabilizing the water present in the oil and generating a stable emulsion which may affect phase separation and accessibility of the sulfhydryl compounds to be scavenged. The purpose of the emulsion breaker, demulsifier and/or non-emulsifier is to break the oil/water emulsion by creating a preferentially water wet surface on the metal sulfide and also to modify the surface tension at the oil/water interface which is stabilized by the metal sulfides to one allowing coalescence of the emulsion.

In a preferred embodiment, the emulsion breaker of group V is part of the inventive composition comprising compounds of groups I and II, of groups I, II and III, of groups I, II and IV or of groups I, II, III and IV. Preferred emulsion breakers are polymeric nonionic surfactants, including but not limited to polysorbates, polymers comprising ethylene oxide, polymers comprising propylene oxide, ethylene oxide-propylene oxide copolymers, alkyl polyglucosides such as decyl maltoside, alkylphenol ethoxylates, and ethoxylated and/or propoxylated alkyl phenol-formaldehyde resins. The emulsion breaker can also be a fatty alcohol alkoxylated with 1 to 200 moles, preferably with 2 to 100 moles and especially with 5 to 50 moles as for example with 1 to 100 moles or 1 to 50 moles or 2 to 50 moles or with 5 to 100 moles of alkylene oxide. Examples for preferred alkylene oxides are ethylene oxide, propylene oxide and their mixtures; preferred fatty alcohols have a $C_4$- to $C_{36}$-alkyl residue and especially a $C_8$- to $C_{24}$-alkyl residue as for example a $C_4$- to $C_{24}$-alkyl residue or a $C_8$- to $C_{32}$-alkyl residue such as cetyl alcohol and oleyl alcohol.

In a preferred embodiment, the emulsion breaker is a compound according to the formula (7)

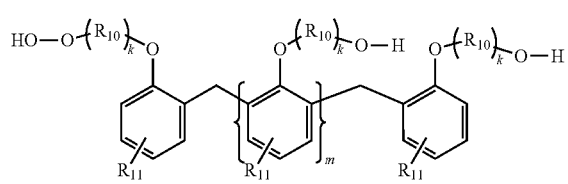

(7)

wherein $R_{10}$ $C_2$ to $C_4$ alkylene $R_{11}$ $C_1$ to $C_{18}$ alkyl k a number from 1 to 200 m a number from 1 to 100 is.

In a preferred embodiment $R_{10}$ is an ethylene or a propylene group. $R_{10}$ may represent mixtures of different $C_2$ to $C_4$ alkylene groups, preferably ethylene and propylene groups.

In another preferred embodiment, $R_{11}$ is a $C_4$ to $C_{12}$ alkyl group, more preferably a tertiary butyl group or an iso-nonyl group.

In formula (7), $R_{10}$, $R_{11}$ and k may be the same in each of the repeating units, or they may differ from unit to unit.

In another preferred embodiment k is a number from 2 to 20.

In another preferred embodiment m is a number from 3 to 20.

In another specific preferred embodiment the emulsion breaker is an alkylbenzenesulfonic as for example dodecylbenzesulfonic acid (8) or its salt with an alkaline metal, ammonia or a primary, secondary or tertiary amine as for example methylamine, ethylamine, propylamine, diethylamine, dimethylamine, trimethylamine, ethanolamine, diethanolamine or triethanolamine.

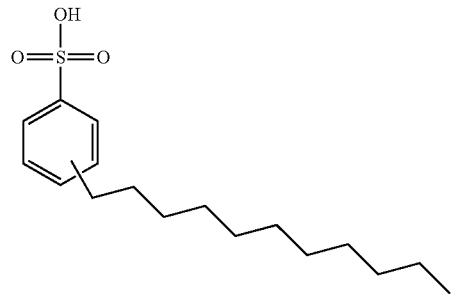

(8)

In another preferred embodiment, the demulsifier is a mixture of at least one compound of formula (7) and an alkylbenzene sulfonic acid (8) or its salt. Such mixture preferably contains (7) and sulfonic acid (8), respectively its salt, in a weight ratio of from 5:1 to 1:5, more preferably in a weight ratio of from 3:1 to 1:3.

The polymeric nonionic surfactant may be added to the further components of the inventive composition neat or preferably dissolved or suspended in a solvent. Any solvent suitable for dissolving or suspending a polymeric nonionic surfactant may be used. Examples of suitable solvents include water, ethylene glycol, propylene glycol, butylene glycol, oligoethylene glycols, oligopropylene glycols, ethers including glycol ethers like methoxyethane, dimethoxyethane and butoxyethanol, alcohols, toluene, xylene, aromatic naphtha, or any combination thereof. The alcohol may include any alcohol suitable for use with oil recovery and for dissolving the polymeric nonionic surfactant and is preferably selected from the group consisting of methanol, ethanol, propanol, isopropyl alcohol, butanol, 2-ethyl hexanol or any combination thereof.

Group VI

The group VI component is optional. This group comprises corrosion inhibitors and serves to add corrosion inhibition functionality to the inventive composition. The addition of a corrosion inhibitor may not be required because the synergist of group III provides sufficient corrosion inhibition to protect the integrity of the whole asset.

However, often addition of a further corrosion inhibitor is advisable to reduce the overall corrosivity, protecting the tubulars and production equipment from corrosion caused by oilfield fluids and gases into which the instant invention is deployed.

A preferred embodiment of the current invention is to use alkyl dimethyl benzyl ammonium chloride according to formula (9) as a corrosion inhibitor that also provides functionality as an interfacial tension reducer.

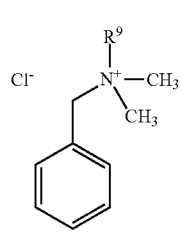

(9)

wherein $R^9$ is $C_8$ to $C_{18}$ alkyl.

The inventive composition may additionally contain biocides, for example, formaldehyde or glutaraldehyde, water dispersants such as polyacrylamide based dispersants, oxygen scavengers, antifoams such as acetylenic diols, silicones or polyethoxylated antifoams, and/or flocculants. Preferably their content is less than 10 wt.-% and especially less than 5 wt.-% relative to the components of the groups I to VI.

In a preferred embodiment, the inventive composition comprises 1 to 60 wt.-% based on its content of active components of groups I to IV of the reaction product of the monohydric alcohol described above in group I, preferably between 5 and 50 wt.-% and especially between 10 and 40 wt.-% as for example between 1 and 50 wt.-% or between 1 and 40 wt.-% or between 5 and 60 wt.-% or between 5 and 40 wt.-% or between 10 and 60 wt.-% or between 10 and 50 wt.-%.

In a preferred embodiment, the inventive composition comprises 1 to 95 wt.-% based on its content of active components of groups I to IV of the reaction product of the sugar alcohol described above in group II, preferably between 10 and 90 wt.-%, more preferably between 20 and 80 wt.-% and especially between 25 and 75 wt.-% as for example between 1 and 90 wt.-% or between 1 and 80 wt.-% or 1 and 75 wt.-% or between 10 and 95 wt.-% or between 10 and 80 wt.-% or between 10 and 75 wt.-% or between 20 and 95 wt.-% or between 20 and 90 wt.-% or between 20 and 75 wt.-% or between 25 and 90 wt.-% or between 25 and 80 wt.-%.

The molar ratio between the reaction product of the monohydric alcohol and an aldehyde or ketone (group I) and the reaction product of the sugar alcohol and an aldehyde or ketone (group II) is preferably between 20:1 and 1:20, preferably between 10:1 and 1:10 and especially between 5:1 and 1:5 as for example between 20:1 and 1:10, between 20:1 and 1:5, between 10:1 and 1:20, between 10:1 and 1:5, between 5:1 and 1:20 or between 5:1 and 1:10.

In a preferred embodiment, the inventive composition comprises 0.1 to 20 wt.-% based on its content of active components of groups I to IV of the synergist described above in group III, preferably between 0.5 and 15 wt.-% and especially between 1 and 10 wt.-% as for example between 0.1 and 15 wt.-% or between 0.1 and 10 wt.-% or between 0.5 and 20 wt.-% or between 0.5 and 10 wt.-% or between 1 and 20 wt.-% or between 1 and 15 wt.-%.

The weight ratio between the reaction products of group I and group II together and the synergist (group III) on the other hand side is preferably between 1000:1 and 5:1, more preferably between 500:1 and 10:1 and especially between 100:1 and 10:1 as for example between 1000:1 and 10:1, between 500:1 and 5:1 or between 100:1 and 5:1.

In a preferred embodiment, the inventive composition comprises 0.1 to 15 wt.-% based on its content of active components of groups I to IV of at least one solids suppression agent described above in group IV, preferably between 0.5 and 10 wt.-% and especially between 1 and 8 wt.-%, as for example between 1 and 10 wt.-% or between 1 and 8 wt.-% or between 5 and 15 wt.-% or between 5 and 8 wt.-% or between 7 and 15 wt.-% or between 7 and 10 wt.-%.

In a preferred embodiment, the inventive composition comprises 0.1 to 10 wt.-% based on its content of active components of groups I to VI of at least one emulsion breaker described above in group V, preferably between 0.5 and 5 wt.-%.

In a preferred embodiment, the inventive composition comprises 0.1 to 10 wt.-% based on its content of active components of groups I to VI of the corrosion inhibitor described above in group VI, preferably between 0.2 and 5 wt.-%.

In a preferred embodiment the compounds of groups I to IV sum up to 100 wt.-%. In a further preferred embodiment the compounds of groups I to IV sum up to 100 wt.-%.

The inventive composition is preferably applied to the oil or gas to be treated in amounts of 0.5 to 50 wt.-ppm, more preferably 1 to 30 wt.-ppm and especially 2 to 20 wt.-ppm as for example 0.5 to 3 wt.-ppm, 0.5 to 20 wt.-ppm, 1 to 50 wt.-ppm, 1 to 20 wt.-ppm, 2 to 50 wt.-ppm or 2 to 30 wt.-ppm per 1 ppm of sulfur contained in the oil or gas.

The use of undiluted compositions according to the invention has proven especially successful in gas contact towers.

In a preferred embodiment the compositions according to the different aspects of the invention are used in formulations additionally comprising water. The water in the formulation may be formed during the manufacture of hemiacetals, or it can be introduced as a solvent for the reactants or it can be added to the composition to balance the formulation. Preferably water is present in a concentration from 1 to 90 wt.-%, preferably between 5 and 80 wt.-% as for example between 1 and 80 wt.-% or 5 and 90 wt.-% of the formulation. In another preferred embodiment water is present to balance up to 100 wt.-% of the formulation.

Alternatively, any balance remaining in a formulated composition according to the different aspects of the invention is made up with water and/or glycol and/or alcohol based solvents in the amounts given above for water alone. Preferred alcohols and glycols are selected from, but not limited to, methanol, ethanol, propan-1-ol, propan-2-ol, ethylene glycol, diethylene glycol, triethylene glycol, neopentyl glycol, 2-butoxyethanol, glycerol and their mixtures.

The inventive compositions can be made by mixing of the compounds of groups I and II, of groups I, II and III, of groups I, II and IV respectively of groups I, II, II and IV each optionally with compounds of groups V and/or VI. The sequence of addition of the individual compounds is not important. In a preferred embodiment the compounds of groups I and II are produced simultaneously in a single pot reaction and subsequently the compounds of groups III and/or IV and optionally V and/or VI are added. For the production of formulations water and/or other solvents can be added to the inventive composition. Alternatively, some or all of the components to make up the inventive composition may contain solvent.

A formulated product containing the inventive composition and solvent is preferably applied in concentrations between 5 and 40,000 mg/L, preferably between 50 and 30,000 mg/L and especially between 100 and 25,000 mg/L as for example between 5 and 40,000 mg/L, between 5 and 25,000 mg/L, between 50 and 40,000 mg/L, between 50 and 25,000 mg/L, between 100 and 40,000 mg/L and between 100 and 30,000 mg/L based on the volume of oil or gas production to be treated. The preferred and best suited concentration of the formulation depends on the formulation activity itself, the type and amount of sulfhydryl compounds to be scavenged, static conditions, temperature and salinity of the system. Furthermore, the material grade of the equipment used for operating the scavenging process should be taken into account: If e.g. a contact tower is made of stainless steel a more concentrated product can be applied while it has proven to be advantageous to apply more dilute product formulations, preferably containing a corrosion inhibitor of group VI, if a poor material of construction as for example carbon steel is used.

At the given concentration range, the inventive composition provides substantial scavenging of sulfhydryl compounds from the treated liquids and gases and ensures a specified sulfur content of e. g. the produced hydrocarbon as it is brought to the market and therefore its safe handling. Furthermore flowability of the treated hydrocarbon will not be impaired due to retardation resp. prevention of the formation of solid sulfhydryl reaction products.

The present invention also includes a process for application of the inventive composition in scavenging of sulfhydryl compounds present in the drilling and the production cycle of mineral oil, particularly as a component of well work-over, well intervention, production enhancement and flow assurance packages.

The composition according to the invention may be injected into a sulfhydryl compound containing stream together with other ingredients known to those familiar with the art. Such other ingredients include acids, dispersants, viscosifiers, lubricity agents, scale inhibitors, friction reducers, cross linker, surfactants, pH adjuster, iron control agents, breakers; this is especially advantageous if any produced water (or recycled water) is in contact with the compositions of the instant invention.

Employing the embodiments of the instant invention allows either i) for a lower dosage rate of scavenger to obtain the same level of residual amount of sulfhydryl compound or ii) for a lower level of residual amount of sulfhydryl compound with the same dosage rate of scavenger in comparison to hemiacetals and/or acetals according to the state of the art. Additionally, in combination with a reaction product from formaldehyde and an amine the kinetics of scavenging $H_2S$ and/or mercaptans provided by the mixture of hemiacetals and/or acetals of a monohydric alcohol and a sugar alcohol with an aldehyde and/or ketone can be significantly accelerated. This allows for a much more efficient scavenging of sulfhydryl compounds especially in applications where only short contact times between the oil or gas and the scavenger are available, as for example in contact towers and direct injection applications for treatment of gases. By admixture of a solids suppression agent to the mixture of hemiacetals and/or acetals of a monohydric alcohol and a sugar alcohol with an aldehyde and/or ketone as a further synergistic additive the gas breakthrough time of a system containing sulfhydryl compounds is extended. While improving the scavenging of sulfhydryl compounds no formation of complex and difficult to treat emulsions is observed. Furthermore the embodiments of the instant invention will not corrode the oilfield equipment that it comes into contact with, nor will it allow the deposition of unwanted solids, such as polymethylenesulfide oligomers and metal sulfide scales, so often found with applications of the prior art. Other applications of the embodiments of the instantaneous invention include treating water for downhole injection for pressure support, treatment of drilling and work-over operations, wettability alteration and well cleanout.

Within this specification, percentages are weight percentages unless specified otherwise.

EXAMPLES

Preparation of Hemiacetals

Method A (using paraformaldehyde, PFA): The amounts of alcohol and water given in table 1 were charged into a stirred reactor. 0.25 wt.-% (based on the mass of alcohols) of sodium hydroxide solution at 50 wt.-% was added. This mixture was homogenized for 10 minutes before paraformaldehyde (PFA, 93 wt.-%) was added in the amount given in table 1 over a period of approximately 30 minutes. The reaction mixture was warmed while stirring for 8 hours at a temperature between 80 to 85° C. After the reaction time, the mixture was cooled to 30° C.

Method B (using aqueous formaldehyde, AFA): A stirred reactor was charged with the quantities of an aqueous solution of formaldehyde (AFA, 37 wt.-%) given in table 1. Then, amounts of alcohols given in table 1 were added followed by 0.25 wt.-% (based on the mass of alcohols) of sodium hydroxide solution at 50 wt.-%. This mixture was homogenized for 10 minutes before heating the stirred reaction mixture to a temperature between 80 to 85° C. for 8 hours. After the reaction time, the mixture was cooled to 30° C.

The sugars were used as pure reagents; in examples A5, A11, A13 and A14 sorbitol was used as a 70 wt.-% active aqueous solution.

The reaction products are characterized by the molar amounts of hemiacetal in respect to the total amount of hydroxyl groups charged and the content of free formaldehyde ($CH_2O$) as determined by $^1H$ NMR spectroscopy.

Further materials used were
hexahydro-1,3,5-trimethyl-s-triazin (HTT) and 3,3'-methylenebis-5-methyloxazolidine (MBO) as the synergists according to group III.
triethylamine (TEA), monoethanolamine (MEA), piperazine (PIP), 5 wt.-% aqueous solution of NaOH (NaOH), and the monosodium salt of glycine (GLY) as the solids suppressants according to group IV. All these materials were commercial grades.

TABLE 1

Preparation of (hemi-)acetals

| | | reactor charge | | | | formaldehyde | reaction product | |
|---|---|---|---|---|---|---|---|---|
| (hemi-)acetal | monohydric alcohol | charge [g] | sugar alcohol | charge [g] | water [g] | source; charge [g] | acetalized [mol-%] | free $CH_2O$ [wt.-%] |
| A1 (comp.) | methanol | 500 | — | 0 | 0 | PFA 500 | 98% | 0.07 |
| A2 (comp.) | ethanol | 600 | — | 0 | 0 | PFA 420 | 99% | 0.06 |
| A3 (comp.) | i-propanol | 600 | — | 0 | 0 | PFA 320 | 99% | 0.08 |
| A4 (comp.) | 2-EH | 800 | — | 0 | 0 | PFA 200 | 98% | 0.11 |
| A5 (comp.) | — | 0 | sorbitol (aq.) | 692 | 0 | AFA 1208 | 79% | 0.07 |
| A6 (comp.) | — | 0 | xylitol | 490 | 0 | AFA 1046 | 77% | 0.09 |
| A7 (comp.) | — | 0 | isomalt | 1416 | 1513 | PFA 955 | 65% | 0.13 |
| A8 (comp.) | — | 0 | inositol | 931 | 400 | PFA 800 | 75% | 0.08 |
| A9 (comp.) | — | 0 | mannitol | 212 | 0 | AFA 368 | 64% | 0.09 |
| A10 (comp.) | — | 0 | erythritol | 155 | 178 | PFA 113 | 69% | 0.05 |
| A11 | ethanol | 23 | sorbitol (aq.) | 130 | 0 | AFA 227 | 76% | 0.07 |

TABLE 1-continued

Preparation of (hemi-)acetals

| | | | reactor charge | | | | | |
|---|---|---|---|---|---|---|---|---|
| | | | | | | formaldehyde | reaction product | |
| (hemi-)acetal | monohydric alcohol | charge [g] | sugar alcohol | charge [g] | water [g] | source; charge [g] | acetalized [mol-%] | free CH$_2$O [wt.-%] |
| A12 | methanol | 19 | sorbitol | 108 | 46 | AFA 270 | 78% | 0.06 |
| A13 | methanol | 19 | sorbitol (aq.) | 154 | 170 | PFA 107 | 78% | 0.08 |
| A14 | methanol | 19 | sorbitol (aq.) | 154 | 0 | AFA 337 | 97% | 0.05 |
| A15 | methanol | 80 | xylitol | 380 | 143 | PFA 387 | 77% | 0.07 |
| A16 | methanol | 45 | isomalt | 484 | 575 | PFA 363 | 68% | 0.14 |
| A17 | methanol | 75 | inositol | 422 | 670 | PFA 423 | 76% | 0.08 |
| A18 | methanol | 77 | mannitol | 438 | 688 | PFA 434 | 77% | 0.08 |
| A19 | methanol | 86 | erythritol | 328 | 0 | AFA 654 | 59% | 0.10 |
| A20 | i-propanol | 150 | erythritol | 305 | 0 | AFA 608 | 56% | 0.14 |

2-EH = 2-ethyl hexanol;
(aq.) = aqueous solution, 70% active

Scavenger Performance Tests—Efficiency

In order to demonstrate the improved efficiency of the instant invention in removing sulfhydryl compounds compared to group I respectively group II compounds alone, the removal of H$_2$S from an oil and from an oil/water mixture was measured.

The oil used was a mixture of kerosene with 10% of xylene with zero bottom sediment and water (BS&W) to simulate oil field conditions.

The oil/water mixture was a mixture of the oil described above and brine (in a 50:50 volume ratio of oil to aqueous phase) to mimic the efficiency in hydrated crude oil.

In a 500 mL stirred autoclave (Parr reactor), 350 mL of the oil respectively the oil/brine mixture was de-aerated for 1 hour with N$_2$, then saturated with a sour gas mixture of 0.2 wt.-% H$_2$S and 99.8 wt.-% CO$_2$, by purging this gas into the oil resp. oil/brine mixture with a flow rate of 0.6 L/min. After equilibration by the sour gas mixture, 1.000 ppm of the composition to be tested was injected into the autoclave by an HPLC pump.

For reasons of better comparability of performance tests the compositions given in tables 2 and 3 containing (hemi-) acetal, synergist and/or solids suppressant as active materials, were applied as 50 wt.-% active formulations in water.

The portions of (hemi-)acetal, synergist and solids suppressant given in tables 2, 3 and 4 refer to the portion of the respective component in the active material, therefore summing up to 100%. For preparation of the compositions given in tables 2, 3 and 4 the water content introduced during preparation of the (hemi-)acetals A1 to A20 according to table 1 was taken into account.

The performance tests were carried out at 30° C. and under 1 bar, using a gas chromatograph to measure the outlet H$_2$S content in the gas phase every two minutes. Then, a graph of the measured values of H$_2$S content (ppm) versus time (min) was plotted. The amount of hydrogen sulfide scavenged is the area above the resultant performance curve, which is calculated by the integration of the curve. For all samples the integration of the curve was done up to 60 min after the injection of H$_2$S-scavenger. As the output parameter of this performance test L$_{sc}$/kgH$_2$S (Liters of H$_2$S scavenger required to remove 1 kg of H$_2$S from the system) has been determined for 6 minutes and 1 hour of analysis. All consumption values (L$_{sc}$/kgH$_2$S) refer to the amount of 100% active composition consumed in the test and are averages of three repeat tests. The test results have been summarized in Table 2 and Table 3. Percentages mean weight percent if not indicated otherwise. Ratios in mixtures of (hemi-)acetals refer to mass portions of active material.

TABLE 2

Performance tests for H$_2$S-scavengers in oil (zero BS&W)

| | (hemi)acetal | | synergist | | solids suppressant | | L$_{sc}$/kg H$_2$S | |
|---|---|---|---|---|---|---|---|---|
| example | Type | amount [wt %] | Type | amount [wt %] | Type | amount [wt %] | @ 6 min. | @ 1 hour |
| P1 (comp.) | A1 | 100 | — | 0 | — | 0 | 19.45 | 8.70 |
| P2 (comp.) | A2 | 100 | — | 0 | — | 0 | 20.76 | 9.56 |
| P3 (comp.) | A3 | 100 | — | 0 | — | 0 | 21.23 | 10.04 |
| P4 (comp.) | A5 | 100 | — | 0 | — | 0 | 19.62 | 9.23 |
| P5 (comp.) | A6 | 100 | — | 0 | — | 0 | 18.57 | 8.58 |
| P6 (comp.) | A7 | 100 | — | 0 | — | 0 | 20.08 | 10.35 |
| P7 (comp.) | A1 + A2 (1:1) | 100 | — | 0 | — | 0 | 19.12 | 9.85 |
| P8 (comp.) | A5 + A6 (2:1) | 100 | — | 0 | — | 0 | 17.68 | 9.05 |
| P9 | A1 + A5 (1:4) | 100 | — | 0 | — | 0 | 14.56 | 7.45 |
| P10 | A2 + A5 (1:1) | 100 | — | 0 | — | 0 | 14.77 | 7.53 |
| P11 | A3 + A6 (1:3) | 100 | — | 0 | — | 0 | 14.06 | 7.43 |
| P12 | A3 + A7 (2:1) | 100 | — | 0 | — | 0 | 14.78 | 7.72 |
| P13 | A11 | 100 | — | 0 | — | 0 | 12.22 | 6.43 |
| P14 | A12 | 100 | — | 0 | — | 0 | 12.05 | 6.32 |

TABLE 2-continued

Performance tests for H₂S-scavengers in oil (zero BS&W)

| example | (hemi)acetal Type | amount [wt %] | synergist Type | amount [wt %] | solids suppressant Type | amount [wt %] | $L_{SC}$/kg H₂S @ 6 min. | @ 1 hour |
|---|---|---|---|---|---|---|---|---|
| P15 | A15 | 100 | — | 0 | — | 0 | 12.43 | 6.71 |
| P16 | A1 + A5 (1:4) | 93 | — | 0 | MEA | 7 | 11.79 | 6.06 |
| P17 | A2 + A5 (1:1) | 93 | — | 0 | GLY | 7 | 11.65 | 5.99 |
| P18 | A3 + A7 (2:1) | 95 | — | 0 | NaOH | 5 | 11.81 | 6.02 |
| P19 | A11 | 93 | — | 0 | GLY | 7 | 11.88 | 5.98 |
| P20 | A12 | 93 | — | 0 | MEA | 7 | 11.79 | 6.03 |
| P21 | A15 | 93 | — | 0 | GLY | 7 | 11.65 | 6.20 |
| P22 | A16 | 93 | — | 0 | PIP | 7 | 11.81 | 6.32 |
| P23 (comp.) | A1 | 98 | MBO | 2 | — | 0 | 6.22 | 4.73 |
| P24 (comp.) | A2 | 98 | MBO | 2 | — | 0 | 6.65 | 4.87 |
| P25 (comp.) | A5 | 98 | MBO | 2 | — | 0 | 5.32 | 4.43 |
| P26 (comp.) | A6 | 98 | MBO | 2 | — | 0 | 5.21 | 4.64 |
| P27 | A1 + A5 (1:4) | 98 | MBO | 2 | — | 0 | 3.21 | 2.68 |
| P28 | A2 + A5 (1:1) | 98 | MBO | 2 | — | 0 | 3.12 | 2.75 |
| P29 | A3 + A6 (1:3) | 98 | MBO | 2 | — | 0 | 3.43 | 2.97 |
| P30 | A11 | 98 | MBO | 2 | — | 0 | 2.99 | 2.65 |
| P31 | A12 | 98 | MBO | 2 | — | 0 | 3.05 | 2.62 |
| P32 | A3 + A6 (1:3) | 98 | MBO | 2 | — | 0 | 3.55 | 2.81 |
| P33 | A11 | 96 | HTT | 4 | — | 0 | 3.23 | 2.76 |
| P34 | A15 | 96 | HTT | 4 | — | 0 | 3.73 | 2.92 |
| P35 | A16 | 96 | HTT | 4 | — | 0 | 3.48 | 2.91 |
| P36 (comp.) | A1 | 93 | MBO | 2 | MEA | 5 | 4.85 | 4.13 |
| P37 (comp.) | A2 | 90 | MBO | 2 | PIP | 8 | 4.94 | 4.20 |
| P38 (comp.) | A3 | 88 | MBO | 2 | TEA | 10 | 8.02 | 6.78 |
| P39 (comp.) | A5 | 93 | MBO | 2 | MEA | 5 | 4.68 | 3.23 |
| P40 (comp.) | A6 | 90 | MBO | 2 | GLY | 8 | 4.75 | 3.26 |
| P41 | A1 + A5 (1:4) | 93 | MBO | 2 | MEA | 5 | 2.25 | 1.99 |
| P42 | A2 + A5 (1:1) | 93 | MBO | 2 | MEA | 5 | 2.41 | 2.07 |
| P43 | A3 + A7 (1:3) | 88 | MBO | 2 | TEA | 10 | 2.60 | 2.31 |
| P44 | A11 | 93 | MBO | 2 | MEA | 5 | 2.20 | 1.87 |
| P45 | A12 | 93 | MBO | 2 | MEA | 5 | 2.13 | 1.85 |
| P46 | A3 + A6 (1:3) | 90 | MBO | 2 | PIP | 8 | 2.55 | 2.28 |
| P47 | A12 | 89 | HTT | 4 | GLY | 7 | 2.15 | 1.84 |
| P49 | A13 | 89 | HTT | 4 | GLY | 7 | 2.43 | 1.90 |
| P50 | A13 | 89 | HTT | 4 | MEA | 7 | 2.47 | 1.92 |
| P51 | A15 | 89 | HTT | 4 | GLY | 7 | 2.36 | 1.83 |
| P52 | A15 | 89 | HTT | 4 | MEA | 7 | 2.34 | 1.85 |
| P53 | A16 | 89 | HTT | 4 | GLY | 7 | 2.40 | 1.89 |

TABLE 3

Performance tests for H₂S-scavenging in a mixture of the oil and brine (50:50 volume ratio of oil to aqueous phase)

| example | (hemi)acetal type | amount [wt %] | synergist type | amount [wt %] | solids suppressant type | amount [wt %] | $L_{SC}$/kg H₂S @ 6 min. | @ 1 hour |
|---|---|---|---|---|---|---|---|---|
| P54 (comp.) | A1 | 100 | — | 0 | — | 0 | 23.36 | 10.04 |
| P55 (comp.) | A2 | 100 | — | 0 | — | 0 | 23.82 | 10.20 |
| P56 (comp.) | A4 | 100 | — | 0 | — | 0 | 23.60 | 12.20 |
| P57 (comp.) | A5 | 100 | — | 0 | — | 0 | 22.78 | 9.31 |
| P58 (comp.) | A8 | 100 | — | 0 | — | 0 | 22.27 | 10.08 |
| P59 (comp.) | A9 | 100 | — | 0 | — | 0 | 23.07 | 10.32 |
| P60 (comp.) | A10 | 100 | — | 0 | — | 0 | 22.97 | 10.27 |
| P61 (comp.) | A1 + A2 (1:1) | 100 | — | 0 | — | 0 | 21.87 | 9.95 |
| P62 (comp.) | A5 + A9 (2:1) | 100 | — | 0 | — | 0 | 20.34 | 9.55 |
| P63 | A1 + A5 (1:4) | 100 | — | 0 | — | 0 | 15.93 | 7.78 |
| P64 | A2 + A5 (1:1) | 100 | — | 0 | — | 0 | 14.97 | 7.83 |
| P65 | A1 + A9 (1:3) | 100 | — | 0 | — | 0 | 15.36 | 8.36 |
| P67 | A13 | 100 | — | 0 | — | 0 | 13.42 | 7.63 |
| P68 | A14 | 100 | — | 0 | — | 0 | 13.52 | 7.72 |
| P69 | A17 | 100 | — | 0 | — | 0 | 13.57 | 7.74 |
| P70 | A19 | 100 | — | 0 | — | 0 | 13.31 | 7.51 |
| P71 | A1 + A5 (1:4) | 93 | — | 0 | GLY | 7 | 12.95 | 7.03 |

TABLE 3-continued

Performance tests for H$_2$S-scavenging in a mixture of the oil and brine (50:50 volume ratio of oil to aqueous phase)

| example | (hemi)acetal type | amount [wt %] | synergist type | amount [wt %] | solids suppressant type | amount [wt %] | $L_{SC}$/kg H$_2$S @ 6 min. | @ 1 hour |
|---|---|---|---|---|---|---|---|---|
| P72 | A1 + A9 (1:3) | 93 | — | 0 | PIP | 7 | 13.47 | 7.26 |
| P73 | A13 | 93 | — | 0 | GLY | 7 | 13.68 | 7.48 |
| P74 | A13 | 93 | — | 0 | MEA | 7 | 13.37 | 7.97 |
| P75 | A14 | 93 | — | 0 | GLY | 7 | 14.03 | 7.48 |
| P76 | A14 | 93 | — | 0 | MEA | 7 | 14.56 | 7.44 |
| P77 | A17 | 93 | — | 0 | GLY | 7 | 15.00 | 7.40 |
| P78 | A19 | 93 | — | 0 | NaOH | 5 | 14.81 | 7.62 |
| P79 (comp.) | A1 | 98 | MBO | 2 | — | 0 | 8.29 | 6.63 |
| P80 (comp.) | A2 | 98 | MBO | 2 | — | 0 | 8.40 | 6.88 |
| P81 (comp.) | A4 | 98 | MBO | 2 | — | 0 | 9.84 | 6.55 |
| P82 (comp.) | A5 | 98 | MBO | 2 | — | 0 | 8.56 | 6.80 |
| P83 (comp.) | A9 | 98 | MBO | 2 | — | 0 | 8.26 | 6.65 |
| P84 | A1 + A5 (1:4) | 98 | MBO | 2 | — | 0 | 6.29 | 5.03 |
| P85 | A2 + A5 (1:1) | 98 | MBO | 2 | — | 0 | 6.12 | 4.99 |
| P86 | A1 + A10 (1:3) | 98 | MBO | 2 | — | 0 | 6.43 | 5.17 |
| P87 | A13 | 98 | MBO | 2 | — | 0 | 6.05 | 5.12 |
| P88 | A14 | 98 | MBO | 2 | — | 0 | 6.12 | 5.20 |
| P89 | A4 + A9 (1:3) | 98 | MBO | 2 | — | 0 | 6.55 | 5.81 |
| P90 | A13 | 96 | HTT | 4 | — | 0 | 6.44 | 5.76 |
| P91 | A14 | 96 | HTT | 4 | — | 0 | 7.03 | 5.92 |
| P92 | A18 | 96 | HTT | 4 | — | 0 | 6.54 | 5.84 |
| P93 (comp.) | A1 | 88 | MBO | 2 | MEA | 10 | 6.52 | 5.56 |
| P94 (comp.) | A2 | 90 | MBO | 2 | PIP | 8 | 6.94 | 5.71 |
| P95 (comp.) | A4 | 88 | MBO | 2 | TEA | 10 | 6.75 | 5.49 |
| P96 (comp.) | A5 | 88 | MBO | 2 | MEA | 10 | 7.05 | 5.92 |
| P97 (comp.) | A10 | 90 | MBO | 2 | PIP | 8 | 6.75 | 5.57 |
| P98 | A1 + A5 (1:4) | 93 | MBO | 2 | MEA | 5 | 4.25 | 3.82 |
| P99 | A2 + A5 (1:1) | 93 | MBO | 2 | MEA | 5 | 4.31 | 3.90 |
| P100 | A4 + A19 (1:3) | 88 | MBO | 2 | TEA | 10 | 4.60 | 4.01 |
| P101 | A13 | 93 | MBO | 2 | MEA | 5 | 4.24 | 3.80 |
| P102 | A14 | 93 | MBO | 2 | MEA | 5 | 4.27 | 3.85 |
| P103 | A4 + A9 (1:3) | 90 | MBO | 2 | PIP | 8 | 4.85 | 3.94 |
| P104 | A10 | 89 | HTT | 4 | GLY | 7 | 4.15 | 3.75 |
| P105 | A13 | 89 | HTT | 4 | GLY | 7 | 4.53 | 3.89 |
| P106 | A13 | 91 | HTT | 4 | NaOH | 5 | 4.49 | 3.84 |
| P107 | A14 | 89 | HTT | 4 | GLY | 7 | 4.81 | 4.01 |
| P108 | A14 | 89 | HTT | 4 | MEA | 7 | 4.63 | 4.05 |
| P109 | A18 | 89 | HTT | 4 | GLY | 7 | 4.41 | 5.84 |
| P110 | A18 | 89 | HTT | 4 | MEA | 7 | 4.43 | 4.83 |
| P111 | A19 | 89 | HTT | 4 | GLY | 7 | 4.61 | 3.89 |
| P112 | A20 | 89 | HTT | 4 | PIP | 7 | 4.76 | 3.99 |

In tables 2 and 3 the lower consumption of the scavenger to remove 1 kg of H$_2$S, the more efficient is the scavenger. In the inventive examples the mixtures of acetals being based on mixtures of monohydric alcohols and sugar alcohols are more efficient than the single components. The efficiency is further improved by the incorporation of a synergist and/or a solids suppressant. Furthermore, incorporation of the synergist enhances the reaction rate in the initial phase of the test as can be seen from the difference between scavenging efficiency after 6 minutes versus 1 hour.

Scavenger Performance Tests—Gas Breakthrough

The performance of the H$_2$S scavengers according to the invention was evaluated for their ability to remove H$_2$S from a flowing gas stream by passing gas laden with H$_2$S through a column of fluid containing the scavenger chemical. A sour gas mixture of 0.2% H$_2$S and 99.8% CO$_2$ is purged with a flow rate of 60 mL/min through 440 mL of a 22% active solution of the scavenger composition in water. Under these conditions the average contact time of gas and scavenger was about 4 seconds. Initially all of the H$_2$S is removed from the gas stream and no H$_2$S is detected in the effluent gas. At some point in time (the breakthrough time or TBT) the chemical can no longer entirely remove H$_2$S from the gas stream and H$_2$S is observed in the effluent. This parameter is a measure of the efficacy of the scavenger especially for contact tower applications with short contact time. The longer the break through time the more efficient is the chemical scavenger.

The effect of the solids suppression agent is rated by visual inspection of the spent scavenger fluid after the gas breakthrough test. The degree of solids formation is rated opaque>turbid>opalescent>clear.

The overall concentration of the scavenger formulations in all examples is 22 wt.-% (active ingredients), i. e. in examples where synergist and/or solids suppressant is present the concentration of (hemi-)acetals is reduced accordingly.

TABLE 4

Gas breakthrough times for different (hemi-)acetals

| example | (hemi-)acetal type | amount [wt.-%] | synergist type | amount [wt-%] | solids suppressant type | amount [wt-%] | TBT [min] | visual inspection |
|---|---|---|---|---|---|---|---|---|
| B1 (comp.) | A1 | 100 | — | 0 | — | 0 | 31 | opaque |
| B2 (comp.) | A2 | 100 | — | 0 | — | 0 | 29 | opaque |
| B3 (comp.) | A5 | 100 | — | 0 | — | 0 | 19 | opaque |
| B4 (comp.) | A7 | 100 | — | 0 | — | 0 | 29 | opaque |
| B5 (comp.) | A10 | 100 | — | 0 | — | 0 | 54 | opaque |
| B6 (comp.) | A1 + A2 (1:1) | 100 | — | 0 | — | 0 | 31 | opaque |
| B7 (comp.) | A5 + A7 (1:1) | 100 | — | 0 | — | 0 | 35 | opaque |
| B8 | A1 + A5 (1:1) | 100 | — | 0 | — | 0 | 43 | opaque |
| B9 | A1 + A5 (1:4) | 100 | — | 0 | — | 0 | 46 | opaque |
| B10 | A1 + A7 (1:4) | 100 | — | 0 | — | 0 | 55 | opaque |
| B11 | A2 + A10 (1:2) | 100 | — | 0 | — | 0 | 49 | opaque |
| B12 | A11 | 100 | — | 0 | — | 0 | 57 | opaque |
| B13 | A12 | 100 | — | 0 | — | 0 | 56 | opaque |
| B14 | A18 | 100 | — | 0 | — | 0 | 53 | opaque |
| B15 (comp.) | A1 | 93 | MBO | 7 | — | 0 | 76 | turbid |
| B16 (comp.) | A2 | 97 | HTT | 3 | — | 0 | 69 | turbid |
| B17 (comp.) | A5 | 97 | HTT | 3 | — | 0 | 77 | turbid |
| B18 (comp.) | A7 | 93 | MBO | 7 | — | 0 | 75 | turbid |
| B19 | A1 + A5 (1:1) | 97 | HTT | 3 | — | 0 | 85 | turbid |
| B20 | A1 + A5 (1:4) | 97 | HTT | 3 | — | 0 | 90 | turbid |
| B21 | A11 | 97 | HTT | 3 | — | 0 | 88 | turbid |
| B22 | A12 | 97 | HTT | 3 | — | 0 | 89 | turbid |
| B23 | A13 | 93 | MBO | 7 | — | 0 | 88 | turbid |
| B24 | A1 + A7 (1:4) | 95 | MBO | 5 | — | 0 | 84 | turbid |
| B25 | A2 + A10 (1:2) | 95 | HTT | 5 | — | 0 | 83 | turbid |
| B26 | A13 | 96 | HTT | 4 | — | 0 | 85 | turbid |
| B27 | A14 | 96 | HTT | 4 | — | 0 | 87 | turbid |
| B28 | A16 | 96 | HTT | 4 | — | 0 | 84 | turbid |
| B29 (comp.) | A1 | 90 | — | 0 | MEA | 10 | 149 | opalescent |
| B30 (comp.) | A2 | 85 | — | 0 | PIP | 15 | 146 | opalescent |
| B31 (comp.) | A3 | 85 | — | 0 | PIP | 15 | 134 | opalescent |
| B32 (comp.) | A5 | 85 | — | 0 | PIP | 15 | 153 | opalescent |
| B33 (comp.) | A7 | 90 | — | 0 | MEA | 10 | 147 | opalescent |
| B34 | A1 + A5 (1:1) | 85 | — | 0 | PIP | 15 | 167 | opalescent |
| B35 | A1 + A5 (1:4) | 85 | — | 0 | PIP | 15 | 180 | opalescent |
| B36 | A11 | 85 | — | 0 | PIP | 15 | 166 | opalescent |
| B37 | A12 | 85 | — | 0 | PIP | 15 | 177 | opalescent |
| B38 | A13 | 95 | — | 0 | NaOH | 5 | 167 | opalescent |
| B39 | A13 | 93 | — | 0 | MEA | 7 | 165 | opalescent |
| B40 | A14 | 93 | — | 0 | GLY | 7 | 158 | opalescent |
| B41 | A14 | 93 | — | 0 | MEA | 7 | 159 | opalescent |
| B42 | A16 | 90 | — | 0 | MEA | 10 | 172 | opalescent |
| B43 | A1 + A7 (1:4) | 85 | — | 0 | PIP | 15 | 170 | opalescent |
| B44 | A2 + A7 (1:2) | 85 | — | 0 | PIP | 15 | 161 | opalescent |
| B45 | A19 | 93 | — | 0 | GLY | 7 | 169 | opalescent |
| B46 (comp.) | A1 | 83 | MBO | 7 | MEA | 10 | 215 | clear |
| B47 (comp.) | A2 | 82 | HTT | 3 | PIP | 15 | 200 | clear |
| B48 (comp.) | A3 | 90 | HTT | 5 | PIP | 15 | 192 | clear |
| B49 (comp.) | A5 | 82 | HTT | 3 | PIP | 15 | 221 | clear |
| B50 (comp.) | A7 | 83 | MBO | 7 | MEA | 10 | 219 | clear |
| B51 | A1 + A5 (1:1) | 82 | HTT | 3 | PIP | 15 | 258 | clear |
| B52 | A1 + A5 (1:4) | 82 | HTT | 3 | PIP | 15 | 288 | clear |
| B53 | A11 | 82 | HTT | 3 | PIP | 15 | 305 | clear |
| B54 | A12 | 82 | HTT | 3 | PIP | 15 | 310 | clear |
| B55 | A12 | 83 | MBO | 7 | MEA | 10 | 300 | clear |
| B56 | A1 + A7 (1:4) | 80 | MBO | 5 | PIP | 15 | 299 | clear |
| B57 | A2 + A10 (1:2) | 80 | HTT | 5 | PIP | 15 | 295 | clear |
| B58 | A10 | 89 | HTT | 4 | GLY | 7 | 320 | clear |
| B59 | A13 | 89 | HTT | 4 | GLY | 7 | 311 | clear |
| B60 | A13 | 89 | HTT | 4 | MEA | 7 | 309 | clear |
| B61 | A14 | 89 | HTT | 4 | GLY | 7 | 295 | clear |
| B62 | A14 | 91 | HTT | 4 | NaOH | 5 | 297 | clear |
| B63 | A19 | 89 | HTT | 4 | MEA | 7 | 298 | clear |

A comparison of the inventive examples and the comparative examples shows that mixtures of (hemi-)acetals containing reaction products of monohydric and sugar alcohols have a higher TBT than the single components or mixtures of components of the same group. The addition of a synergist according to group III increases the H$_2$S scavenging activity of (hemi-)acetals and especially of mixtures of (hemi-)acetals significantly. The scavenging process becomes faster and more efficient. The addition of a solids suppressant further significantly improves the performance of the scavenger. Formation of solids is mostly inhibited which otherwise hampers the accessibility of part of the

The invention claimed is:

1. A composition comprising
   I. at least one reaction product between a nitrogen-free monohydric alcohol and an aldehyde or ketone, and
   II. at least one reaction product between a sugar alcohol and an aldehyde or ketone wherein the reaction products I. and II. are hemiacetals and/or acetals.

2. The composition according to claim 1, further comprising
   III. at least one reaction product from formaldehyde and ammonia and/or an amine, selected from the group consisting of primary alkyl amines having 1 to 10 carbon atoms, and primary hydroxy alkyl amines having 2 to 10 carbon atoms.

3. The composition according to claim 1, further comprising
   IV. at least one inorganic or organic alkaline compound that functions as a solids suppression agent.

4. The composition according to claim 1 wherein the aldehyde or ketone contains 1 to 10 carbon atoms.

5. The composition according to claim 1, wherein the aldehyde or ketone is selected from the group consisting of formaldehyde, paraformaldehyde, glyoxal, acetaldehyde, propionaldehyde, butyraldehyde and glutaraldehyde.

6. The composition according to claim 1, wherein the aldehyde or ketone is formaldehyde.

7. The composition according to claim 1, wherein the monohydric alcohol comprises 1 to 15 carbon atoms.

8. The composition according to claim 1, wherein the monohydric alcohol is an aliphatic alcohol.

9. The composition according to claim 1, wherein the monohydric alcohol is selected from the group consisting of methanol, ethanol, propanol, iso-propanol, n-butanol, iso-butanol, tert-butanol, pentanol, hexanol, heptanol and octanol, and any mixture thereof.

10. The composition according to claim 1, wherein the sugar alcohol is a polyol obtainable by reduction of a sugar.

11. The composition according to claim 1, wherein the sugar alcohol contains 4 to 12 carbon atoms and 4 to 10 hydroxy groups wherein not more than one hydroxy group is attached to each carbon atom.

12. The composition according to claim 1, wherein the sugar alcohol is selected from tetritols, pentitols and hexitols.

13. The composition according to claim 1, wherein the sugar alcohol is selected from the group consisting of erythritol, threitol, arabitol, ribitol, xylitol, allitol, dulcitol, sorbitol, iditol, mannitol, talitol, inositol.

14. The composition according to claim 1, wherein the sugar alcohol is a linear sugar alcohol having the general formula (1)

$$HO-CH_2-(CHOH)_n-CH_2-OH \qquad (1)$$

wherein n is 2, 3 or 4.

15. The composition according to claim 1, wherein the reaction product between a sugar alcohol and an aldehyde or ketone is selected from the group consisting of:

$$OHCHR_1-O-CH_2-CH(OCHR_1OH)-CH(OCHR_1OH)-CH(OCHR_1OH)-CH_2-O-CHR_1OH \qquad (2),$$

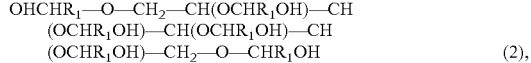

$$OHCHR_1-O-CH_2-CH(OCHR_1OH)-CHOH-CH(OCHR_1OH)-CH(OCHR_1OH)-CH_2-O-CHR_1OH \qquad (3),$$

$$OHCHR_1-O-CH_2-CH(OCHR_1OH)-CHOH-CH(OCHR_1OH)-CHOH-CH_2-O-CHR_1OH \qquad (4),$$

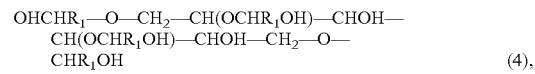

and $OH-CH_2-CH(OCHR_1OH)-CHOH-CH(OCHR_1OH)-CHOH-CH_2-O-CHR_1OH$ (5),

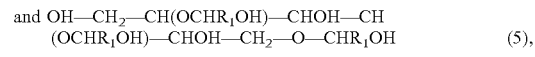

wherein $R_1$ is H or $C_1$ to $C_9$ alkyl.

16. The composition according to claim 1, wherein the reaction product III of an amine and formaldehyde corresponds to formula (6a)

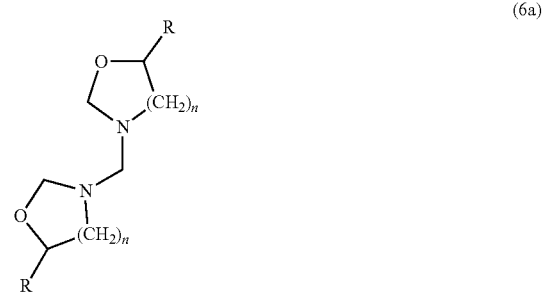

wherein
R is H or methyl, and
n is 1 or 2.

17. The composition according to claim 1, wherein the reaction product III of an amine and formaldehyde corresponds to the formula (6b)

wherein each $R^2$ is $C_1$ to $C_4$ alkyl or $C_2$ to $C_4$ hydroxy alkyl.

18. The composition according to claim 16, wherein the compound of formula 6a is 3,3'-methylenebis-5-methyl-oxazolidine.

19. The composition according to claim 1, wherein the reaction product III of an amine and formaldehyde is present in the composition in an amount from 1 wt.-% to 20 wt. %.

20. The composition according to claim 3, wherein the alkaline compound IV. is selected from the group consisting of
   IV(a). alkaline metal salts or alkaline earth metal salts,
   IV(b). ammonia; alkyl amines, aryl amines or alkylaryl amines,
   IV(c). hydroxy alkyl amines, hydroxy aryl amines or hydroxy alkylaryl amines,
   IV(d). multifunctional amines containing besides an amino group, at least one further functional group selected from the group consisting of amino groups, ether groups and acid groups or an ester, amide or salt thereof, and
   IV(e). mixtures of compounds of groups IV(a) to IV(c), wherein "alkyl" means $C_1$ to $C_{20}$ alkyl, "aryl" means $C_6$ to $C_{20}$ aryl and "alkylaryl" means $C_7$ to $C_{20}$ alkylaryl.

21. The composition according to claim 1, comprising 1 to 60 wt.-% of the reaction product between a monohydric alcohol and an aldehyde or ketone.

22. The composition according to claim 1, comprising 1 to 95 wt.-% of the reaction product between a sugar alcohol and an aldehyde or ketone.

23. The composition according to claim 1, wherein the molar ratio between the reaction product between a monohydric alcohol and an aldehyde or ketone (group I) and the reaction product between a sugar alcohol and an aldehyde or ketone (group II) is between 20:1 and 1:20.

24. The composition according to claim 2, wherein the ratio between the combined reaction products of group I and group II on the one hand side and the at least one reaction product from formaldehyde and ammonia and/or an amine of group III on the other hand side is between 1000:1 and 5:1.

25. Composition according to claim 1, comprising 0.1 to 15 wt. % of at least one solids suppression agent (group IV).

26. A composition comprising
I. at least one reaction product between a nitrogen-free monohydric alcohol and an aldehyde or ketone,
II. at least one reaction product between a sugar alcohol and an aldehyde or ketone wherein the reaction products I. and II. are hemiacetals and/or acetals, and
an alkyl dimethyl benzyl ammonium chloride according to formula (9) as a corrosion inhibitor

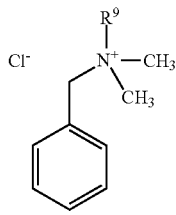

(9)

wherein $R^9$ is $C_8$ to $C_{18}$ alkyl.

27. The composition according to claim 26, wherein the compound of formula (9) is present in an amount between 0.01 and 5 wt. %.

28. A composition comprising
I. at least one reaction product between a nitrogen-free monohydric alcohol and an aldehyde or ketone,
II. at least one reaction product between a sugar alcohol and an aldehyde or ketone wherein the reaction products I. and II. are hemiacetals and/or acetals, and a demulsifier in an amount between 0.1 to 10 wt. %.

29. The composition according to claim 28, wherein the demulsifier is selected from the group consisting of polysorbates, fatty alcohols, polymers comprising ethylene oxide, polymers comprising propylene oxide, ethylene oxide-propylene oxide copolymers, alkyl polyglucosides, alkylphenol ethoxylates, alkyl polyethylene oxide, alkylbenzenesulfonic acid and ethoxylated and/or propoxylated alkyl phenol-formaldehyde resins.

30. The composition according to claim 28, wherein the demulsifier corresponds to the formula (7)

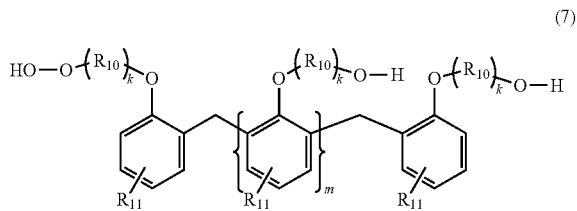

(7)

wherein
$R_{10}$ is $C_2$ to $C_4$ alkylene,
$R_{11}$ is $C_1$ to $C_{18}$ alkyl,
k is a number from 1 to 200,
m is a number from 1 to 100.

31. The composition according to claim 28, wherein the demulsifier is dodecylbenezesulfonic acid (8)

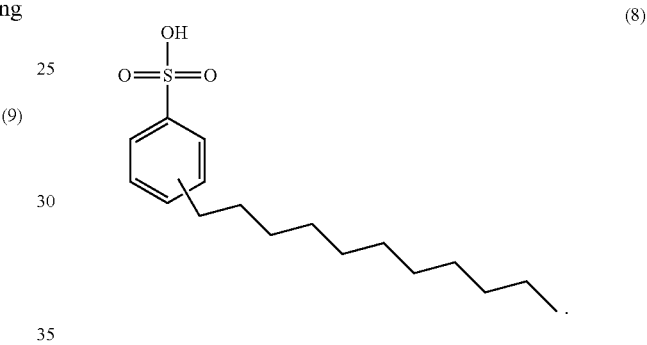

(8)

32. The composition according to claim 28, wherein the demulsifier is a mixture of at least one compound of formula (7) and at least one compound of formula (8) in a weight ratio of from 5:1 to 1:5.

33. A formulation, comprising 10 to 99 wt.-% of a composition according to claim 1, and 1 to 90 wt.-% of a solvent selected from the group consisting of water, methanol, ethanol, propan-1-ol, propan-2-ol, ethylene glycol, diethylene glycol, triethylene glycol, neopentyl glycol, 2-butoxyethanol, glycerol and their mixtures.

34. A process for the scavenging of hydrogen sulphide and/or mercaptans, comprising the step of adding to a medium comprising such hydrogen sulphide or mercaptans a composition comprising
I. at least one reaction product between a nitrogen-free monohydric alcohol and an aldehyde or ketone, and
II. at least one reaction product between a sugar alcohol and an aldehyde or ketone wherein the reaction products I. and II. are hemiacetals and/or acetals.

* * * * *